(12) United States Patent
Kurashina

(10) Patent No.: US 7,095,550 B2
(45) Date of Patent: *Aug. 22, 2006

(54) SUBSTRATE HAVING A PLANARIZATION LAYER AND METHOD OF MANUFACTURE THEREFOR, SUBSTRATE FOR ELECTRO-OPTICAL DEVICE, ELECTRO-OPTICAL DEVICE, AND ELECTRONIC APPARATUS

(75) Inventor: Hisaki Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 25 days.

This patent is subject to a terminal disclaimer.

(21) Appl. No.: 10/752,008

(22) Filed: Jan. 7, 2004

(65) Prior Publication Data

US 2004/0207087 A1   Oct. 21, 2004

(30) Foreign Application Priority Data

Mar. 13, 2003   (JP) .......................................... 2003-068335
Oct. 10, 2003   (JP) .......................................... 2003-352677

(51) Int. Cl.
| | | |
|---|---|---|
| G02F 1/00 | (2006.01) | |
| G02F 1/1333 | (2006.01) | |
| G02F 1/03 | (2006.01) | |
| H01L 23/48 | (2006.01) | |
| H01L 21/66 | (2006.01) | |

(52) U.S. Cl. ....................... 359/321; 257/758; 349/158; 438/18; 359/245

(58) Field of Classification Search .................... 257/48, 257/758; 349/139, 147, 158; 359/245, 315, 359/321; 438/18, 29, 30

See application file for complete search history.

(56) References Cited

U.S. PATENT DOCUMENTS

| | | |
|---|---|---|
| 5,982,470 A | 11/1999 | Nakahara et al. |
| 6,144,082 A | 11/2000 | Yamazaki et al. |
| 6,373,544 B1 | 4/2002 | Hirabayashi |
| 6,404,023 B1 | 6/2002 | Mori et al. |
| 6,528,822 B1 | 3/2003 | Murade |
| 6,836,140 B1 | 12/2004 | Fujikawa et al. |
| 2004/0184131 A1 * | 9/2004 | Kurashina .................... 359/245 |

FOREIGN PATENT DOCUMENTS

| | | |
|---|---|---|
| JP | 05-226475 | 9/1993 |
| JP | 06-194690 | 7/1994 |

(Continued)

*Primary Examiner*—David N. Spector
(74) *Attorney, Agent, or Firm*—Oliff & Berridge, PLC

(57) ABSTRACT

A plurality of film formation layers where film formation patterns are formed, respectively, interlayer films which are formed between the plurality of film formation layers, respectively, a plurality of sub-interlayer-film wiring patterns, which are formed in film formation layers beneath the planarized interlayer films of the interlayer films, a plurality of contact holes formed in the planarized interlayer films in order to connect the plurality of sub-interlayer-film wiring patterns and the film formation patterns of layers above the planarized interlayer films, and one or more dummy patterns which are formed on a plurality of positions under the plurality of contact holes and which are formed in one or more film formation layers under the plurality of sub-interlayer-film wiring patterns, respectively so as to control the positions of the surfaces of the plurality of sub-interlayer-film wiring patterns.

13 Claims, 10 Drawing Sheets

FOREIGN PATENT DOCUMENTS

| | | |
|---|---|---|
| JP | 07-074175 | 3/1995 |
| JP | 07-092477 | 4/1995 |
| JP | 09-068718 | 3/1997 |
| JP | 09-162281 | 6/1997 |
| JP | 10-228026 | 8/1998 |
| JP | 11-72804 | 3/1999 |
| JP | 2000-040827 | 2/2000 |
| JP | 2000-365999 | 2/2000 |
| JP | 2000-081636 | 3/2000 |
| JP | 2000-23113 | 8/2000 |
| JP | 2001-100647 | 4/2001 |
| JP | B2 3188411 | 5/2001 |
| JP | 2001-196474 | 7/2001 |
| JP | 2001-308336 | 11/2001 |
| JP | 2001-337344 | 12/2001 |
| JP | 2001-343912 | 12/2001 |
| JP | B2 3304298 | 5/2002 |
| JP | 2002-207223 | 7/2002 |

* cited by examiner

STEP (1)

STEP (2)

STEP (3)

STEP (4)

STEP (5)

SUBSTRATE HAVING A PLANARIZATION LAYER AND METHOD OF MANUFACTURE THEREFOR, SUBSTRATE FOR ELECTRO-OPTICAL DEVICE, ELECTRO-OPTICAL DEVICE, AND ELECTRONIC APPARATUS

BACKGROUND OF THE INVENTION

1. Field of Invention

The present invention relates to a substrate of a multilayer structure, especially a TFT substrate, and a substrate having a planarization layer suitable for a liquid crystal device, etc. using the TFT substrate and a manufacturing method thereof, and a substrate for an electro-optical device, and an electro-optical device.

2. Description of Related Art

A liquid crystal device is constructed by filling liquid crystal between two sheets of substrates, such as a glass substrate or quartz substrate. A liquid crystal device can display images by providing active elements, such as a thin film transistor (hereinafter referred to as TFT) and pixel electrodes in a matrix shape on one substrate and counter electrodes (transparent electrodes (ITO (indium tin oxide))) on the other substrate, and changing optical properties of the liquid crystal layer filled between both substrates in response to image signals.

An electro-optical device, such as an active matrix addressed liquid crystal device using active elements, is configured by providing pixel electrodes and switching elements on a substrate (an active matrix substrate) to correspond to each intersection of a plurality of scan lines (gate lines) and data lines (source lines) which are arranged in longitudinal and transverse directions, respectively.

A switching element, such as a TFT element, is turned on by an ON signal applied to a gate line and writes an image signal applied through a source line into a pixel electrode (a transparent electrode (ITO)). In this way, voltage based on an image signal is applied to a liquid crystal layer between a pixel electrode and a counter electrode, thereby changing the array of liquid crystal molecules. In this way, a transmittance ratio of a pixel changes, and light passing through a pixel electrode and a liquid crystal layer changes according to the image signal, thereby performing image display.

Meanwhile, in a case where each element constituting an element substrate, such as a TFT substrate, is provided on one plane of a substrate, the occupying area of the element increases and the area of a pixel electrode part decreases, thus reducing the aperture ratio of a pixel. Therefore, in the related art a stacked structure has employed such that each element is divided into a plurality of layers and each film formation layer is electrically isolated by disposing an interlayer insulating film between each layer (film formation layer).

That is, an element substrate is constructed by stacking each film formation layer, such as a semiconductor thin film, an insulating thin film, or a conductive thin film with a predetermined pattern on a glass or quartz substrate. A TFT substrate is formed by repeatedly performing a variety of film formation steps and a photolithography step over every film formation layer. For instance, on a TFT substrate, film formation layers, such as a semiconductor layer, constituting a channel of a TFT element, a wiring layer, such as a data line, and a pixel electrode layer formed of an ITO film are stacked.

However, according to a film formation pattern of each layer, the surface of a stacked structure of film formation layers has irregularities. When such irregularities occur in a layer being in contact with a liquid crystal layer, defects tend to occur in the alignment of liquid crystal. Thus, in a lower layer of a layer adjacent to a liquid crystal layer, an interlayer insulating film may be planarized. For instance, an interlayer insulating film forming a lower layer of a pixel electrode layer is polished and planarized by CMP (chemical mechanical polishing) or the like.

While the variation in thickness of the respective layers falls within approximately 5% when CMP is not performed, the film thickness of the interlayer insulating film changes every portion thereof according to the irregularities of a film formation pattern, when CMP is performed. In this case, the variation in the film thickness reaches even 20–30%. When two film formation patterns on and beneath the interlayer insulating film are connected to each other, a contact hole is formed by making an opening in the interlayer insulating film and, through the contact hole, two film formation patterns on and beneath the interlayer insulating film are electrically connected to each other. Two or more types of film formation patterns may be formed in the same film formation layer, and two or more contact holes may be formed in a single interlayer insulating film.

When an interlayer insulating film is planarized by CMP, a contact hole formed in a relatively thicker portion of the interlayer insulating film is made different in depth from a contact hole formed in a thinner portion thereof. In this case, in etching to make an opening in the interlayer insulating film, only a shorter contact hole is completely opened. A longer contact hole is not completely opened by performing an etching step once. When the longer contact hole is completely opened, grounding wires of a lower layer to be connected through a shorter contact hole may be completely etched to be removed in an over-etching step. Specifically, a problem occurs that a plurality of contact holes formed in an interlayer insulating film are not opened by performing an etching step once when the interlayer insulating film is planarized by CMP.

Further, a situation occurs that when an interlayer insulating film is planarized by CMP, a portion of an interlayer insulating film becomes relatively thicker compared to the case where an interlayer insulating film is not planarized by CMP. When a contact hole is formed in the thick portion of the interlayer insulating film, the ratio of the depth of a contact hole to the length of bottom side of a contact hole, i.e., an aspect ratio, may be made relatively large. In this case, a problem occurs that the adhesion of a metal film in a contact hole becomes poor so that contact characteristics are deteriorated.

SUMMARY OF THE INVENTION

The present invention is provided to address these problems. Therefore, the present invention provides a substrate having a planarization layer, a method of manufacture therefore, a substrate for an electro-optical device, and an electro-optical device, capable of enhancing a contact characteristics by making contact holes equal in depth anywhere in the planarized interlayer insulating film and at the same time by making an aspect ratio relatively small with regard to a contact hole.

In an aspect of the present invention a substrate for an electro-optical device having a planarization layer includes a plurality of sub-interlayer-film wiring patterns formed in film formation layers disposed above a substrate; interlayer films formed on the plurality of sub-interlayer-film wiring patterns and whose surfaces are planarized; a plurality of contact holes formed in the planarized interlayer films corresponding to portions of the plurality of sub-interlayer-film wiring patterns; and a stacked film which is formed between the substrate and the plurality of sub-interlayer-film wiring patterns and whose portions corresponding to each region of the plurality of contact holes are equal or nearly equal in thickness.

By such a configuration, in sub-interlayer-film wiring patterns where contact holes are formed, it is possible to equalize the heights from a certain base level of a substrate surface over the entire substrate, and even after an interlayer film is planarized by CMP, a plurality of contact holes formed in an interlayer film are made equal or nearly equal in depth. In this way, it is possible to uniformly open all contact holes by performing an interlayer-film removal step once.

Also, in an aspect of the present invention a substrate for an electro-optical device having a planarization layer includes, above a substrate having recesses in a portion of the substrate surface: a plurality of sub-interlayer-film wiring patterns formed in film formation layers disposed in at least one of the region of the recesses and other regions; interlayer films formed on the plurality of the sub-interlayer-film wiring patterns and whose surfaces are planarized; a plurality of contact holes formed in the planarized interlayer films corresponding to portions of the plurality of sub-interlayer-film wiring patterns; and a stacked film which is formed between the substrate and the plurality of sub-interlayer-film wiring patterns, values obtained by subtracting the sunken distance of recesses along the normal direction of the substrate surface from the thickness of the stacked film portions corresponding to each region of the plurality of contact holes being equal or nearly equal.

Herein, the sunken distance of the recess along the normal direction of the substrate surface refers to a recess depth of a recess region measured by setting the original surface or the highest surface of a substrate as a base level, the recess may be formed due to, for example, etching.

According to such a configuration, even though there is a recess in a portion of a substrate surface, it is possible that the heights from a certain base level of a substrate surface are equal over the entire substrate in sub-interlayer-film wiring patterns where contact holes are formed. Thus, even after planarizing the interlayer film by CMP, a plurality of contact holes formed in the interlayer film are made equal or nearly equal in depth. As a result, it is possible to extend uniformly all contact holes by performing an interlayer-film removal step once.

Moreover, a substrate having a planarization layer according to an aspect of the present invention is characterized in that the substrate includes a plurality of film formation layers where film formation patterns are formed, respectively; interlayer films formed between the plurality of film formation layers, respectively; a plurality of sub-interlayer-film wiring patterns formed in the film formation layers beneath planarized interlayer films of the interlayer films; a plurality of contact holes formed in the planarized interlayer films in order to connect the plurality of sub-interlayer-film wiring patterns and film formation patterns of layers above the planarized interlayer films; and one or more dummy patterns which are formed in a plurality of positions under the plurality of contact holes, and which are formed in one or more film formation layers under the plurality of sub-interlayer-film wiring patterns, respectively, so as to control positions of the surfaces of the plurality of sub-interlayer-film wiring patterns.

According to such a configuration, a plurality of film formation layers each having a film formation pattern have a multilayer structure, and interlayer films are formed between each of film formation layers. A plurality of sub-interlayer-film wiring patterns formed in the film formation layers beneath the planarized interlayer films among interlayer films are connected to film formation patterns in the upper layer through a plurality of contact holes formed in the planarized interlayer films, respectively. On a plurality of positions under the plurality of contact holes, one or more dummy patterns are formed in one or more film formation layers under the plurality of sub-interlayer-film wiring patterns. By suitably arranging each dummy pattern, a vertical position of a surface of each sub-interlayer-film wiring patterns under the plurality of contact holes is controlled. In this way, for instance, it is possible to equalize the vertical positions of the surface of every sub-interlayer-film wiring pattern. That is, in this case, since the interlayer films on the sub-interlayer-film wiring patterns are planarized, every contact hole is made equal in depth, thereby making all contact holes open by performing the step once. Also, since it is possible to raise the vertical positions of a plurality of sub-interlayer-film wiring patterns by one or more dummy patterns, it is possible to enhance the contact characteristics by making the aspect ratio of a contact hole relatively small.

Further, the one or more dummy patterns are characterized by independently controlling the positions of the surfaces of the plurality of sub-interlayer-film wiring patterns so that the plurality of contact holes are extended from the surfaces of the planarized interlayer films to the plurality of sub-interlayer-film wiring patterns by performing an interlayer-film removal step once.

According to such a configuration, it is possible to independently control the vertical positions of the surfaces of the sub-interlayer-film wiring patterns by suitably forming one or more dummy patterns. In this way, it is possible to open all contact holes by performing an interlayer-film removal step once.

Also, the one or more dummy patterns are characterized by being formed independently of each other under the plurality of sub-interlayer-film wiring patterns so as to equalize the vertical positions of the surfaces of the plurality of sub-interlayer-film wiring patterns.

According to such a configuration, one or more dummy patterns are formed independently of each other under sub-interlayer-film wiring patterns, respectively. In this way, it is possible to definitely control the vertical positions of surfaces of the sub-interlayer-film wiring patterns.

Also, the one or more dummy patterns are characterized by being formed independently of each other in the same film formation patterns of the film formation layers under the plurality of sub-interlayer-film wiring patterns.

According to such a configuration, since the same film formation patterns of the film formation layers are formed under the sub-interlayer-film wiring patterns, it is possible to equalize the vertical positions of the surfaces of the sub-interlayer-film wiring patterns.

Also, the dummy pattern is characterized by being provided to extend from the film formation patterns of the film formation layers in other regions of the same layer as the dummy patterns.

According to such a configuration, it is possible to open uniformly all contact holes by performing an interlayer-film removal step once, and at the same time, the dummy patterns are provided to extend from the film formation patterns of the film formation layers in other regions. Thus, the dummy patterns are in the same electric potentials as the film formation patterns of the film formation layers in other regions.

For example, in a case where a film formation pattern of a film formation layer in an other region is a light shielding film of a pixel region connected to the ground electric potential, the dummy pattern also becomes the ground electric potential, and the electric potential of a sub-interlayer-film wiring pattern over the dummy pattern is stabilized by capacitive coupling with the ground electric potential.

Also, the one or mote dummy patterns are characterized by being formed to equalize the total film thickness of the film formation patterns formed at positions corresponding to each contact hole under the plurality of sub-interlayer-film wiring patterns.

According to such a configuration, the vertical positions of a plurality of sub-interlayer-film wiring patterns are equalized, and it is possible to make every contact hole formed in the planarized interlayer film equal in depth.

An aspect of the present invention is also characterized in that the plurality of contact holes are removed by etching the planarized interlayer films, and the one or more dummy patterns control, independently of each other, the vertical positions of surfaces of the plurality of sub-interlayer-film wiring patterns with a permissible margin of only an over-etching portion for any of the plurality of sub-interlayer-film wiring patterns.

According to such a configuration, even in a case where the vertical positions of the plurality of sub-interlayer-film wiring patterns are a little different from each other, any of sub-interlayer-film wiring patterns is over-etched only within a permissible range. Thus, it is possible to open all contact holes by performing an etching step once.

Further, a method of manufacturing a substrate having a planarization layer according to an aspect of the present invention is characterized in that the method includes a step of forming one or more dummy patterns on one or more positions of one or more film formation layers by the same step as a forming step of each film formation pattern of a plurality of film formation layers to be stacked, respectively, a step of forming interlayer films on the film formation layers, a step of forming a plurality of sub-interlayer-film wiring patterns in wiring layers of the plurality of film formation layers, a step of planarizing the interlayer films formed on the wiring layers, and a step of forming a plurality of contact holes for connecting the plurality of sub-interlayer-film wiring patterns and a plurality of film formation patterns of layers above the plurality of the interlayer films in the planarized interlayer films at a plurality of positions over the dummy patterns, the dummy patterns controlling the vertical positions of surfaces of the plurality of sub-interlayer-film wiring patterns.

According to such a configuration, one or more dummy patterns are formed at one or more positions of one or more film formation layers. A plurality of sub-interlayer-film wiring patterns are formed in the wiring layers, and interlayer films are formed on the sub-interlayer-film wiring patterns and then are planarized. A plurality of contact holes for connecting a plurality of sub-interlayer-film wiring patterns and a plurality of film formation patterns of layers above the planarized interlayer films are formed in the planarized interlayer films. The vertical position of surface of each sub-interlayer-film wiring pattern under the plurality of contact holes is controlled by suitably arranging each dummy pattern. In this way, it is possible to make every contact hole equal in depth, thus making all contact holes by performing an etching step once. Also, by making the vertical position of the surface of each sub-interlayer-film wiring pattern high, it is possible to make a low aspect ratio of a contact hole and to enhance contact characteristics.

Moreover, a substrate for an electro-optical device according to an aspect of the present invention is characterized in that the substrate includes a pixel electrode layer where a film formation patterns of pixel electrodes are formed to correspond to each intersection of a plurality of data lines and a plurality of scan lines which are arranged planarly in a matrix; a first film formation layer where the film formation patterns of the plurality of data lines are formed; a second film formation layer where the film formation patterns of the plurality of scan lines and a film formation pattern of switching elements for applying signals to the pixel electrodes are formed, interlayer films which are formed between the pixel electrode layer, the first film formation layer, and the second film formation layer, respectively; a plurality of sub-interlayer-film wiring patterns which are formed in a film formation layers beneath the planarized interlayer films of the interlayer films and which are formed in any one of the pixel electrode layer, the first film formation layer, the second film formation layer, and the other film formation layers; a plurality of contact holes which are formed in the planarized interlayer films in order to connect the plurality of sub-interlayer-film wiring patterns and film formation patterns of layers above the planarized interlayer films; and one or more dummy patterns which are formed at a plurality of positions under the plurality of contact holes and which are formed in one or more film formation layers of layers below the plurality of sub-interlayer-film wiring patterns, respectively so as to control the positions of the surfaces of the plurality of sub-interlayer-film wiring patterns.

According to such a configuration, a pixel electrode layer, a first film formation layer forming a film formation pattern of a data line, and a second film formation layer forming a film formation pattern of a scan line are formed. The film formation patterns of sub-interlayer-film wiring patterns are formed in these film formation layers or the other film formation layers. The vertical positions of sub-interlayer-film wiring patterns are defined by one or more dummy patterns. By suitably arranging one or more dummy patterns, it is possible to equalize the vertical positions of the surfaces of the sub-interlayer-film wiring patterns, thereby making contact holes open by performing a step once. Also, it is possible to make a low aspect ratio of a contact hole, thereby enhancing contact characteristics.

An electro-optical device according to an aspect of the present invention is characterized by making use of the substrate for the electro-optical device. Also, an electronic apparatus according to an aspect of the present invention is characterized by making use of the electro-optical device.

According to such a configuration, it is possible to open contact holes by performing a step once and to obtain a device with excellent contact characteristics.

DETAILED DESCRIPTION OF EXEMPLARY EMBODIMENTS

Figure 1:
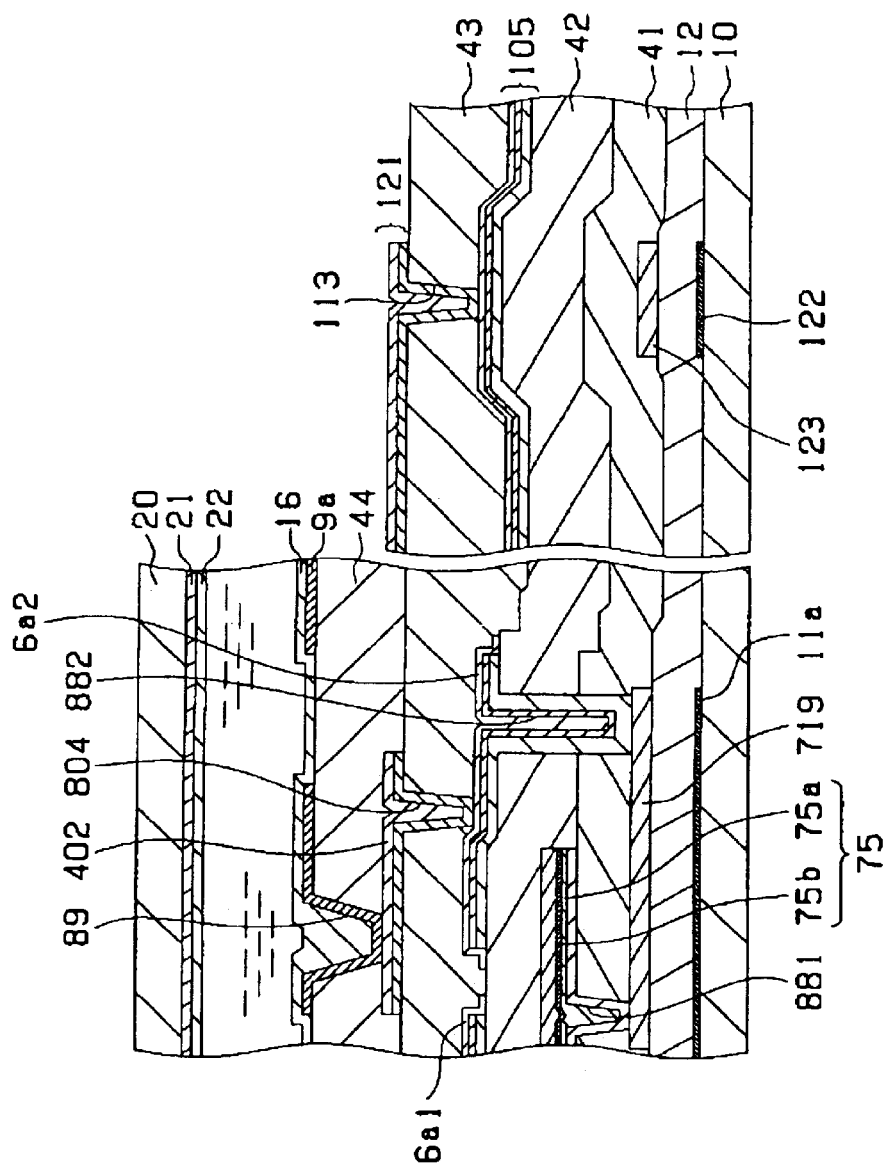
FIG. 1 is a sectional view showing an element forming region and a wiring layer region of a substrate having a planarization layer according to a first exemplary embodiment of the present invention.
Figure 2:
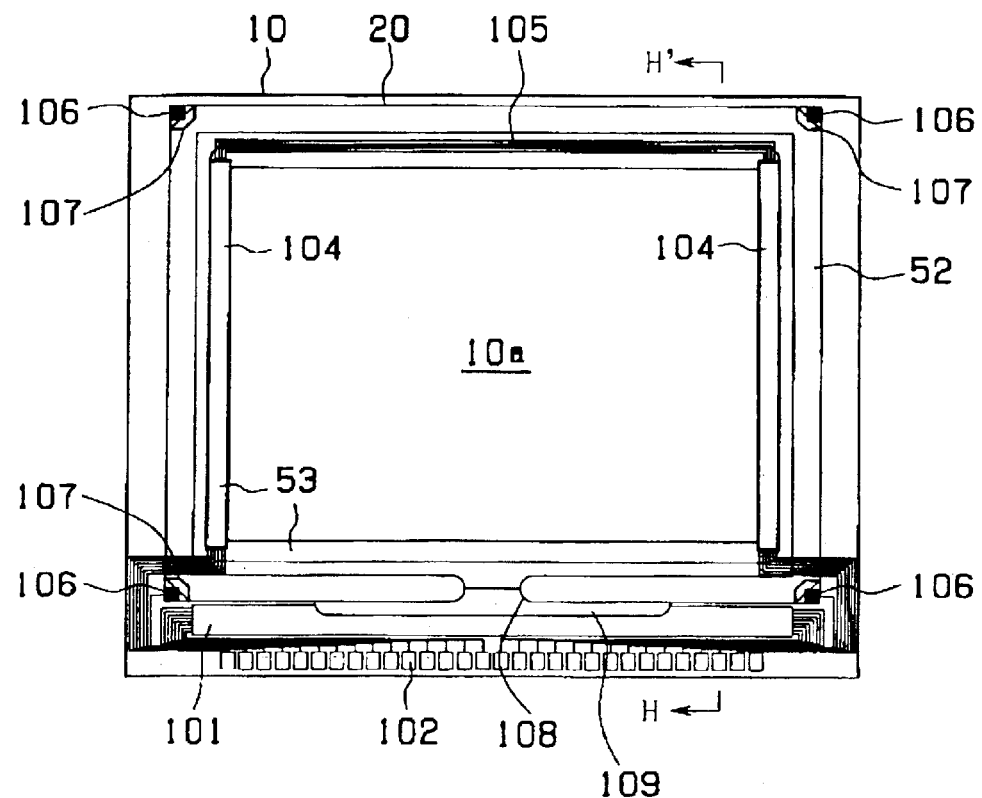
FIG. 2 is a plan view from a counter substrate side showing a liquid crystal device which is an electro-optical device configured using a substrate for a liquid crystal device as a substrate for an electro-optical device according to the present exemplary embodiment, together with each component formed thereon.
Figure 3:
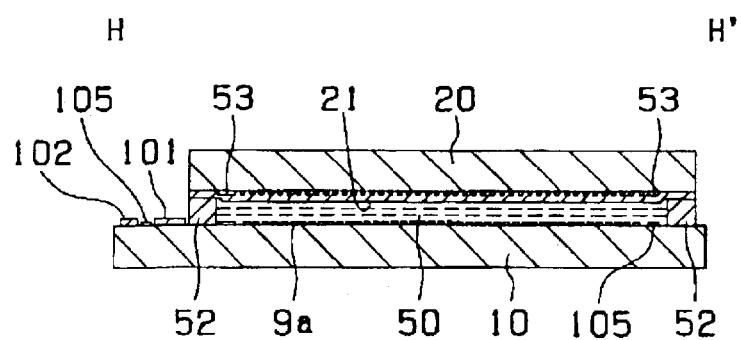
FIG. 3 is a sectional view from plane H–H' of FIG. 2 showing a liquid crystal device after a packaging step of adhering an element substrate and a counter substrate to face each other and then filling liquid crystal.
Figure 4:
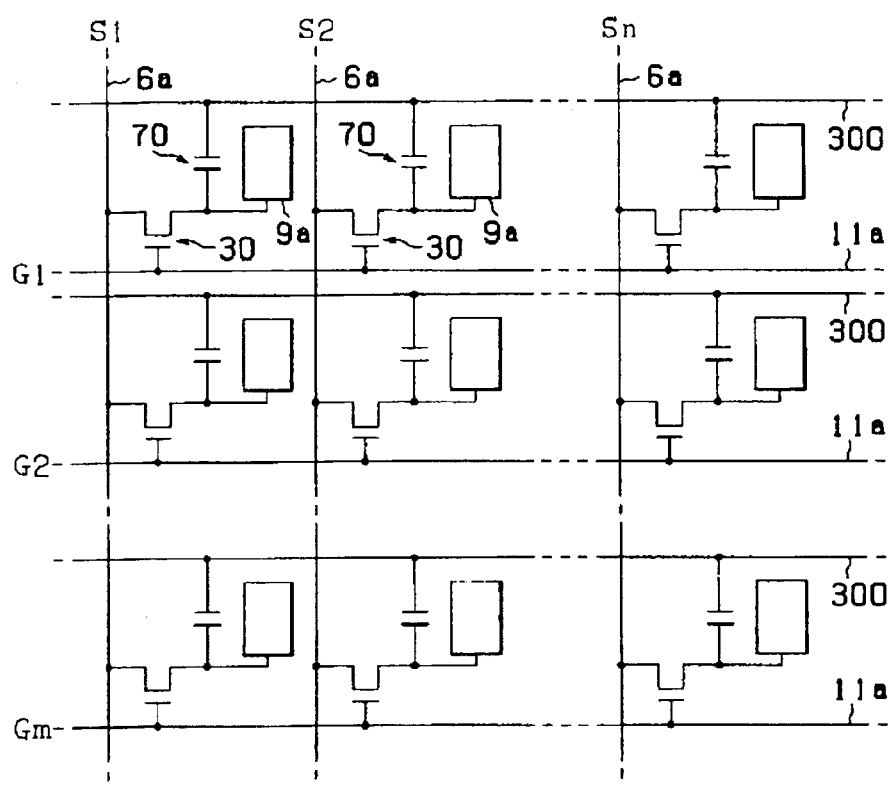
FIG. 4 is an equivalent schematic diagram showing a variety of elements, wires, etc. in a plurality of pixels constituting a pixel region of a liquid crystal device.
Figure 5:
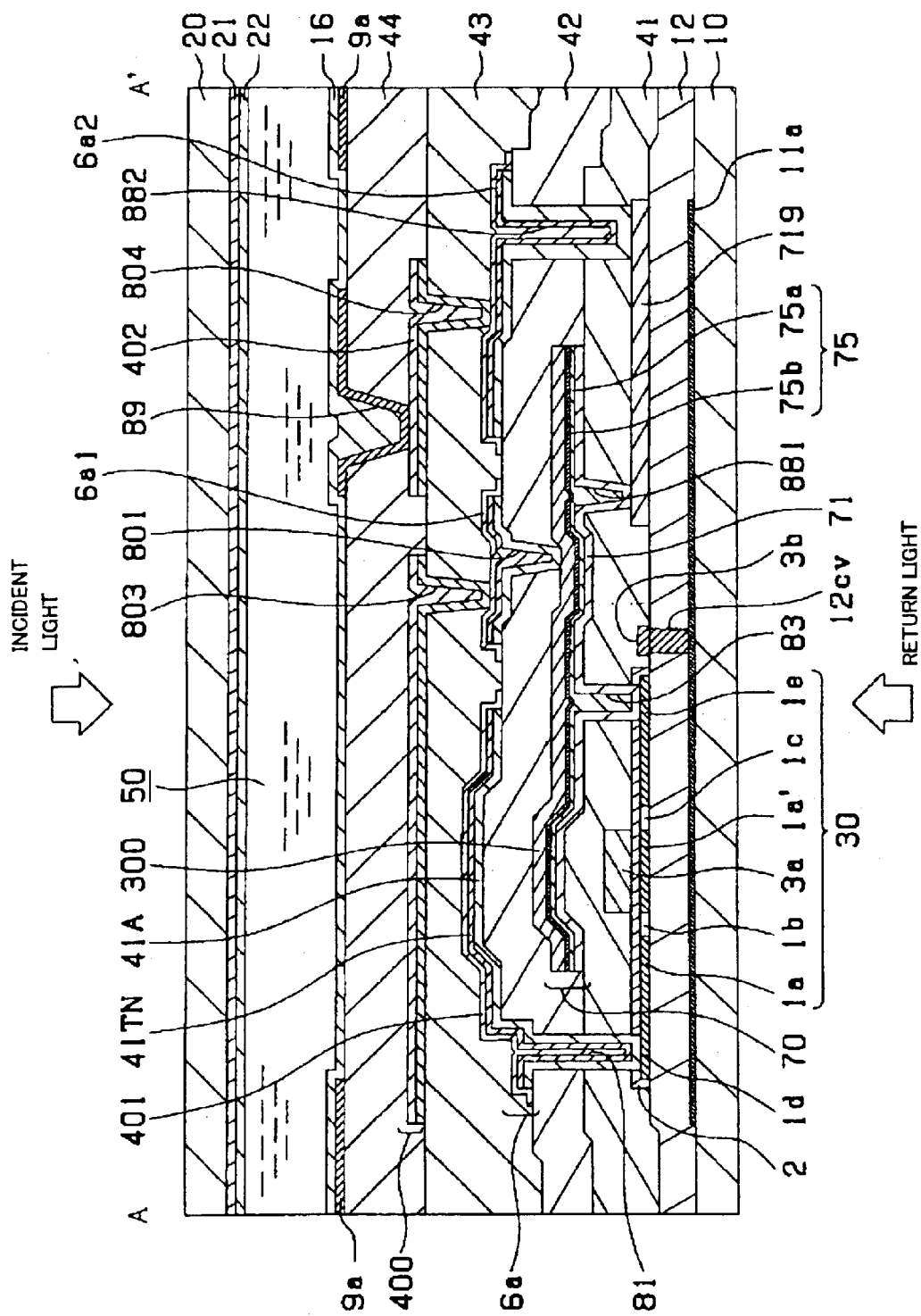
FIG. 5 is a detailed sectional view showing a pixel structure of a liquid crystal device.
Figure 6:
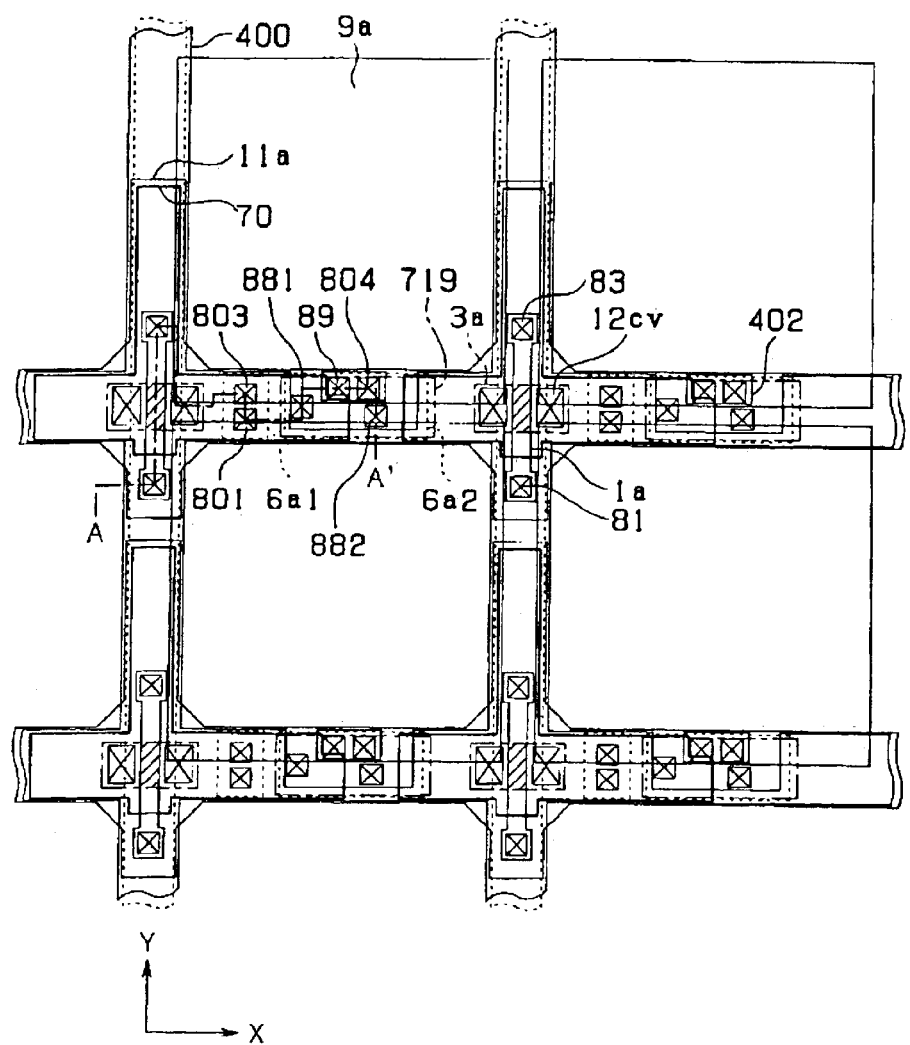
FIG. 6 is a plan view showing a film formation pattern of each layer for a plurality of adjacent pixels formed on a TFT substrate according to the present exemplary embodiment.
Figure 7:
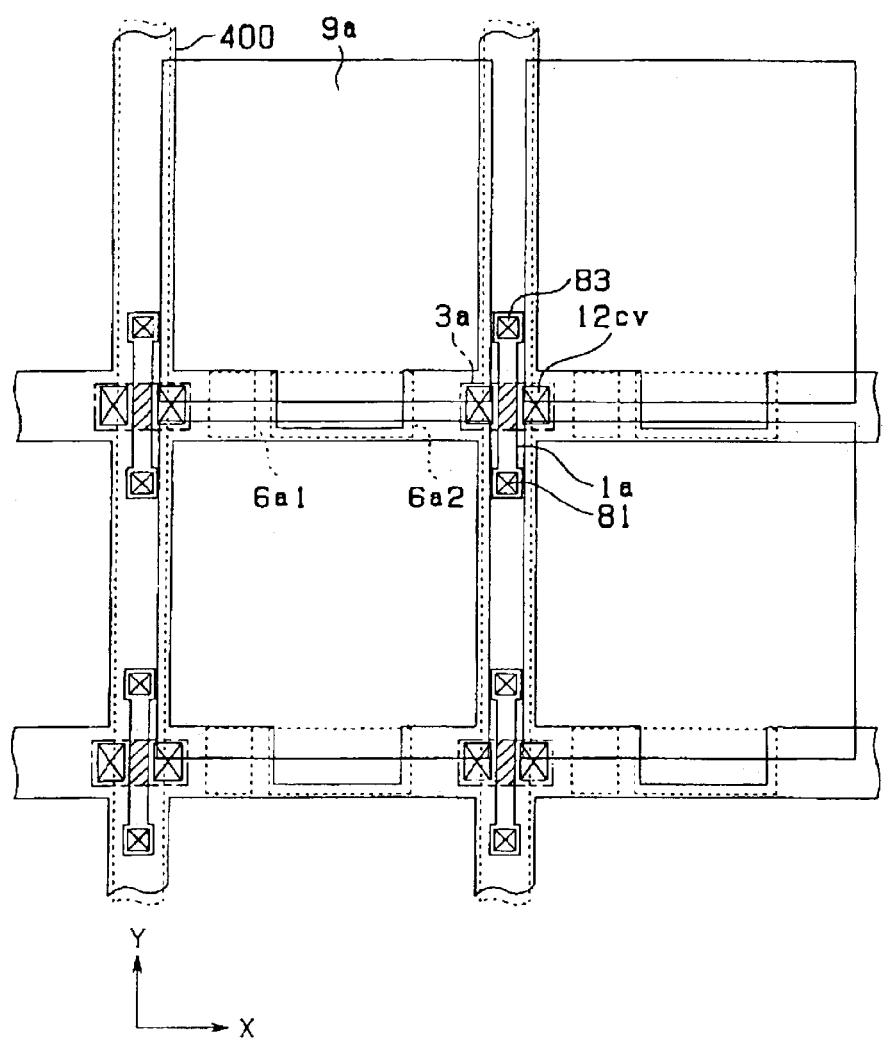
FIG. 7 is a plan view showing the film formation pattern of the main part in FIG. 6.
Figure 8:
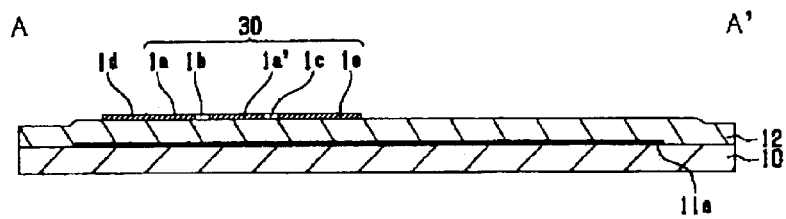
FIG. 8 is a process flow schematic showing a method of manufacturing a substrate for a liquid crystal device in a sectional view.
Figure 8:
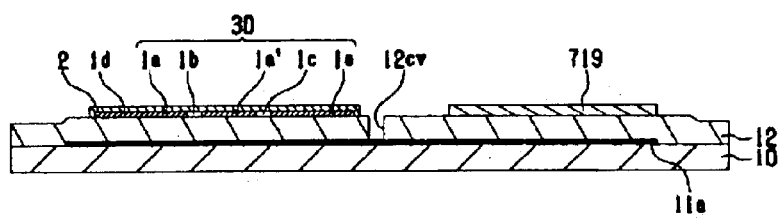
Figure 8:
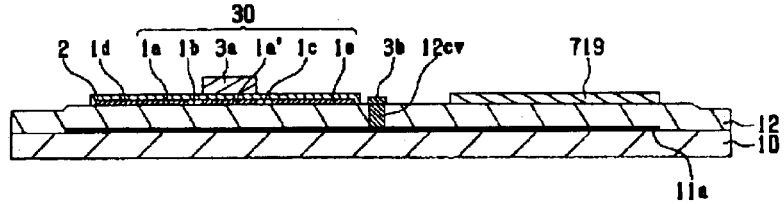
Figure 8:
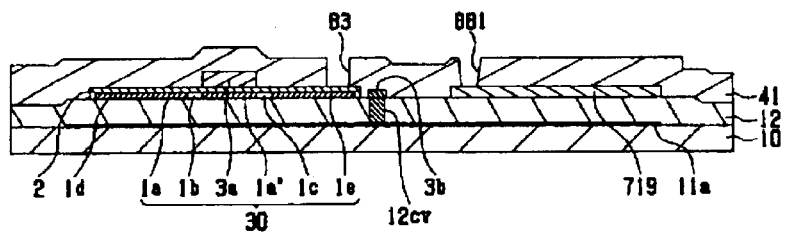
Figure 8:
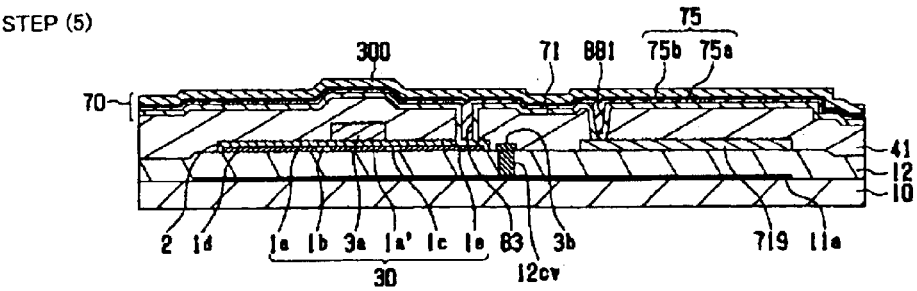
Figure 9:
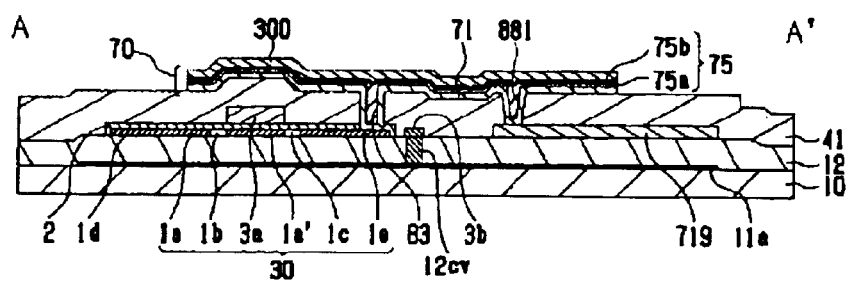
FIG. 9 is a process flow schematic showing a method of manufacturing a substrate for a liquid crystal device in a sectional view.
Figure 9:
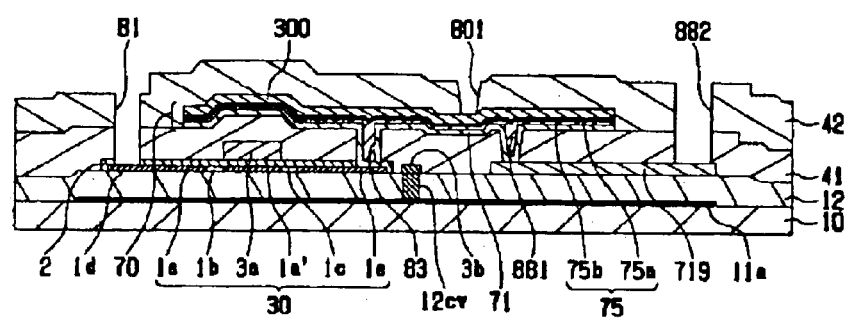
Figure 9:
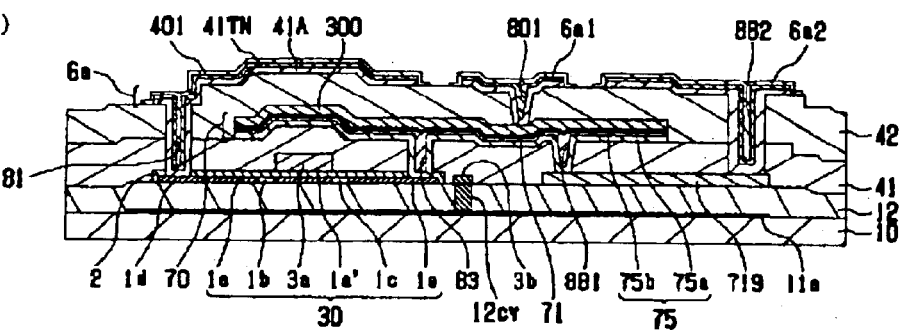
Figure 9:
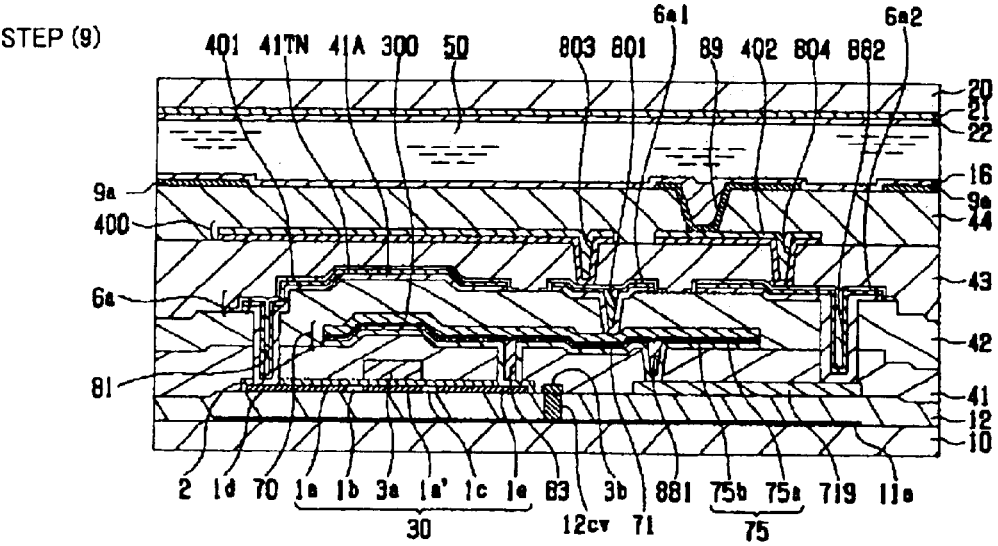

Reference will now be made in detail to the exemplary embodiments of the present invention in conjunction with the accompanying figures. FIG. 1 is a sectional view showing an element forming region and a wiring layer region of a substrate having a planarization layer according to one exemplary embodiment of the present invention. The present exemplary embodiment is configured to apply to a substrate for a liquid crystal device like a TFT substrate which is a substrate for an electro-optical device as a substrate having a planarization layer. FIG. 2 is a plan view from a counter substrate side showing a liquid crystal device which is an electro-optical device using a substrate for a liquid crystal device as a substrate for an electro-optical device according to the present exemplary embodiment, along with each component formed thereon. FIG. 3 is a sectional view from plane H–H' of FIG. 2 showing a liquid crystal device after a packaging step of adhering an element substrate and a counter substrate to face each other and then filling liquid crystal. FIG. 4 is an equivalent circuit schematic showing a variety of elements, wires, etc. in a plurality of pixels composing a pixel region (an element region) of a liquid crystal device. FIG. 5 is a detailed sectional view showing a pixel structure of a liquid crystal device. FIG. 6 is a plan view showing a film formation pattern of each layer for a plurality of adjacent pixels formed on a TFT substrate according to the present exemplary embodiment. FIG. 7 is a plan view showing the film formation pattern of the main part in FIG. 6. FIGS. 8 and 9 are process flow schematics showing a method of manufacturing a substrate for a liquid crystal device in a sectional view. The above-mentioned figures are drawn on different scales for the respective layers or components in order for each layer or component to be recognizable in each figure.

According to the present exemplary embodiment, on horizontal positions of contact holes formed in a planarized interlayer insulating film, dummy patterns are formed in a film formation layer under film formation patterns beneath the interlayer insulating films (hereinafter referred to as sub-interlayer-film wiring patterns) so as to roughly equalize the vertical positions of the surfaces of film formation patterns on the lower sides of the interlayer insulating films with regard to sub-interlayer-film wiring patterns, thereby making the contact holes formed in the planarized interlayer insulating film equal in depth. In this way, it is possible to open all contact holes by performing an etching step once, and to enhance the contact characteristics by making an aspect ratio relatively small.

First, reference will now be made in detail to the exemplary embodiments of the entire configuration of a liquid crystal device configured using a substrate for a liquid crystal device having a planarization layer in conjunction with FIGS. 2 to 4.

A liquid crystal device is, as shown in FIGS. 2 and 3, configured by filling liquid crystal 50 between a TFT substrate 10 as an element substrate and a counter substrate 20. A pixel electrode (ITO) 9a and the like constituting a pixel are disposed in a matrix form on a TFT substrate 10. A counter electrode (ITO) 21 is provided in the entire surface of a counter substrate 20. FIG. 4 shows an equivalent circuit of elements composing a pixel formed on the TFT substrate 10.

Referring to FIG. 4, in a pixel region, a plurality of scan lines 11a and a plurality of data lines 6a are arranged to intersect, and pixel electrodes 9a are disposed in a matrix form in regions partitioned by scan lines 11a and data lines 6a. TFTs 30 are provided corresponding to each intersection of the scan lines 11a and the data lines 6a, and are connected to pixel electrodes 9a.

A TFT 30 is turned on by ON signal of the scan line 11a, and an image signal applied to the data line 6a is thereby applied to the pixel electrode 9a. A voltage between the pixel electrode 9a and the counter electrode 21 provided in the counter substrate 20 is applied to liquid crystal 50. Also, the accumulative capacitance 70 is provided in parallel with the pixel electrode 9a so that the voltage of the pixel electrode 9a can be retained for a longer time of, for example, 3 digits than the time when a source voltage is applied owing to the accumulative capacitance 70. Also, a voltage retaining property is enhanced owing to the accumulative capacitance 70, thereby making it possible to display an image with a high contrast ratio.

FIG. 5 is a schematic sectional view showing a single pixel structure of a liquid crystal device, and FIGS. 6 and 7 are plan views showing a film formation pattern of each layer.

Referring to FIG. 6, a plurality of pixel electrodes 9a are provided in a matrix form on a TFT substrate 10(a dotted portion denotes its contour), and a data line 6a and a scan line 11a are provided along the boundaries on length and breadth sides of a pixel electrode 9a, respectively. A data line 6a is, as will be described later, formed of a stacked structure including an aluminum film, etc. and a scan line 11a is, for instance, formed of a conductive polysilicon film, etc. Also, a scan line 11a is electrically connected to a gate electrode 3a opposite a channel region 1a' indicated with an oblique region with lines slanted from the right among a semiconductor layer 1a in the figure. That is, a gate electrode 3a connected to a scan line 11a and a channel region 1a' are arranged to face each other at each intersection of scan lines 11a and data lines 6a respectively, composing a TFT 30 for a pixel switching.

Referring to FIG. 5 which is a sectional view from plane A–A' of FIG. 6, an electro-optical device includes, for instance, a TFT substrate 10 formed of a quartz substrate, a glass substrate, or a silicon substrate, and a counter substrate 20 formed of a glass substrate or a quartz substrate which is disposed to face the TFT substrate.

Referring to FIG. 5, on a TFT substrate 10, a pixel electrode 9a is provided, and an alignment film 16 which is subjected to a predetermined alignment step, such as a rubbing step, is provided thereon. A pixel electrode 9a is made of, for instance, a transparent conductive film, such as an ITO film. Meanwhile, on a counter substrate 20, a counter electrode 21 is provided throughout the counter substrate 20, and an alignment film 22 which is subjected to a predetermined alignment step, such as a rubbing step is provided on the entire counter electrode. Similarly to the above-mentioned pixel electrode 9a, a counter electrode 21 is made of, for instance, a transparent conductive film, such as an ITO film, and alignment films, 16 and 22 are made of, for instance, transparent organic films such as polyimide films.

In this way, between a TFT substrate 10 and a counter substrate 20, which are disposed to face each other, an electro-optical material, such as liquid crystal, is filled in a space surrounded by a sealing material 52 (see FIGS. 2 and 3), forming a liquid crystal layer 50. The liquid crystal layer 50 has a predetermined alignment state by alignment films 16 and 22 with no electric field applied from the pixel electrode 9a. The liquid crystal layer 50 is made of, for instance, an electro-optical material composed of a single kind of nematic liquid crystal or a mixture of various kinds of nematic liquid crystals. A sealing material 52 is an adhesive made of, for example, a photocurable resin or a thermal curable resin to coat the periphery of a TFT substrate 10 and a counter substrate 20, and there exists together a spacer, such as a glass fiber or a glass bead for spacing both substrates out.

Meanwhile, in addition to a pixel electrode 9a and an alignment film 16, various components including these are provided in a stacked structure on a TFT substrate 10. Referring to FIG. 5, the stacked structure is formed by sequentially providing from the bottom a first layer (film formation layer) including a scan line 11a, a second layer including TFT 30 including a gate electrode 3a, a third layer including an accumulative capacitance 70, a fourth layer including a data line 6a, a fifth layer including a shield layer 400, and a sixth layer (top layer) including the pixel electrode 9a and the alignment film 16. Also, a basic insulating film 12 is provided between the first layer and the second layer, a first interlayer insulating film 41 is provided between the second and the third layers, a second interlayer insulating film 42 is provided between the third and the fourth layers, a third interlayer insulating film 43 is provided between the fourth and the fifth layers, and a fourth interlayer insulating film 44 is provided between the fifth and the sixth layers, respectively, thereby reducing or preventing a short circuit of the above-mentioned components. Also, for instance, a contact hole for electrically connecting a data line 6a to a high concentration source region 1d among a semiconductor layer 1a of a TFT 30 is also provided in the insulating films 12, 41, 42, 43, and 44. These components are now set forth sequentially from the bottom layer.

On the first layer, a scan line 11a is provided which is made of, for instance, a metallic simple substance, alloy, metal silicide, polysilicide, a stacked structure of these, or a conductive polysilicon including at least one of refractory metals, such as Ti (titanium), Cr (chromium), W (tungsten), Ta (tantalum), Mo (molybdenum) and the like. The scan line 11a is patterned in stripes along the direction of X in FIG. 6 in plan view. Specifically, a scan line 11a in stripes has a primary line portion extending along the direction of X in FIG. 6 and a protrusive portion extending along the direction of Y in FIG. 6 in which a data line 6a or a shield layer 400 is extended. Also, the protrusive portions extending from the adjacent scan lines 11a are not in contact with each other, and thus every line of the scan lines 11a is separated from each other.

In this way, a scan line 11a has a function of simultaneously controlling ON/OFF of TFTs 30 existing in the same row. Also, the scan line 11a has a function of blocking light incident on a TFT 30 from the lower side, since the scan line 11a is formed to nearly cover the region where a pixel electrode 9a is not formed. Thus, it is possible to reduce or prevent photo-leakage current from occurring in a semiconductor layer 1a of a TFT 30, and to display a high quality image without flicker or the like.

On the second layer, a TFT 30 including a gate electrode 3a is provided. Referring to FIG. 5, the TFT 30 has a LLD (lightly doped drain) structure, and includes, as its components, the above-mentioned gate electrode 3a, a channel region 1a' of a semiconductor layer 1a where a channel is formed, for instance, by electric field from a gate electrode 3a made of a polysilicon film, an insulating film 2 including a gate insulating film which insulates between a gate electrode 3a and a semiconductor layer 1a, and a low concentration source region 1b, a low concentration drain region 1c, a high concentration source region 1d, and a high concentration drain region 1e in the semiconductor layer 1a.

On the second layer, an relay electrode 719 is formed as the same film as the above-mentioned gate electrode 3a. Referring to FIG. 6, in plan view, this relay electrode 719 is formed in an island form so as to place approximately in the center of the one side of each pixel electrode 9a. Since the relay electrode 719 and the gate electrode 3a are made of the same films when the latter is made of, for instance, a conductive polysilicon film, the former is also made of a conductive polysilicon film.

Also, the above-mentioned TFT 30 preferably has a LDD structure as shown in FIG. 5, while it may have a offset structure without implanting impurities into a low concentration source region 1b and a low concentration drain region 1c, or it may have a self-aligned TFT where impurities with a high concentration are implanted using the gate electrode 3a as a mask thereby forming a high concentration source region and a high concentration drain region in a self-aligned manner. Also, the present exemplary embodiment is configured by using a single gate structure where only a single gate electrode of a TFT 30 for pixel switching is disposed between a high concentration source region 1d and a high concentration drain region 1e, but more than two gate electrodes may be disposed therebetween. If a TFT is configured with more than dual gate or triple gate like this, it is possible to reduce or prevent current from leaking in the junction between a channel and source/drain regions, thus reducing current during OFF.

Moreover, a semiconductor layer 1a constituting a TFT 30 may be a monocrystal or non-monocrystal layer. In the formation of a monocrystal layer, a related art, such as adhesion may be used. It is possible to obtain, especially, high performance peripheral circuits by forming a semiconductor layer 1a of a monocrystal layer.

A basic insulating film 12 made of, for instance, a silicon oxide film and the like is provided over the above-mentioned scan line 11a and under the TFT 30. By forming the basic insulating film 12 in the entire surface of a TFT substrate 10, the basic insulating film 12 has a function of reducing or preventing characteristics of a TFT 30 for pixel switching from changing due to the surface roughness caused by polishing of a TFT substrate 10, the stain after cleaning, or the like, in addition to the function of interlayer insulating a TFT 30 from a scan line 11a.

A trench (contact hole) 12cv with the same width as a channel length of a semiconductor layer 1a, which is extending along the later-described data line 6a to both sides of the semiconductor layer 1a in plan view, is formed in the basic insulating film 12, so that a gate electrode 3a stacked thereon corresponding to the trench 12cv includes a hollow below. Also, the gate electrode 3a is formed to cover the entire trench 12cv, and a sidewall 3b integrally formed with this is provided on the gate electrode 3a. In this way, the semiconductor layer 1a of a TFT 30 is configured to be covered from a lateral side in plan view as shown in FIG. 6, and thus to reduce or prevent light incident on at least this portion.

The sidewall 3b is formed to cover the trench 12cv, and also its bottom is in contact with the above-mentioned scan line 11a. Since the scan line 11a is formed in stripes as described above, both a gate electrode 3a and a scan line 11a in a certain row always have in the equivalent electric potential, as far as that row is concerned.

Also, such a structure may be employed wherein a different scan line including a gate electrode 3a is formed, making it parallel with a scan line 11a. In this case, the scan line 11a and the different scan line have a redundancy wiring structure. In this way, for instance, even though the normal conduction is made impossible due to some defects in a portion of the scan line 11a, as long as the different scan line existing in the same row as the scan line 11a is normal, it is possible to normally control the operation of TFT 30 through the scan line.

An accumulative capacitance 70 is provided in a third layer. The accumulative capacitance 70 is formed by disposing a lower electrode 71 as a capacitance electrode on a pixel electric potential side connected to a high concentration drain region 1e of a TFT 30 and a pixel electrode 9a, and a capacitance electrode 300 as a capacitance electrode on a fixed electric potential side to face each other via a dielectric film 75. Owing to the accumulative capacitance 70, it is possible to enhance the electric potential retaining property in a pixel electrode 9a.

Also, as shown in plan view of FIG. 6, since the accumulative capacitance 70 is formed so as not to reach a light transmissive region nearly corresponding to a forming region of a pixel electrode 9a (i.e., it is formed to enter within the light shielding region), an aperture ratio of pixel in the entire electro-optical device is kept relatively high, thereby making it possible to display more bright image.

Specifically, a lower electrode 71 is made of, for instance, a conductive polysilicon film, and acts as a capacitive electrode of a pixel electric potential side. However, the lower electrode 71 may be formed of a single layer film or multilayer film including metal or alloy. Also, the lower electrode 71 acts as an intermediary means to connect a pixel electrode 9a and a high concentration drain region 1e of a TFT 30 other than a capacitive electrode of a pixel electric potential side. This intermediary connection is, as will be described later, achieved through the relay electrode 719.

The capacitive electrode 300 acts as a capacitive electrode of a fixed electric potential side of an accumulative capacitance 70. In order to maintain the capacitive electrode 300 at a fixed electric potential, it is configured to electrically connect to a shield layer 400 with a fixed electric potential.

The capacitive electrode 300 is formed on a TFT substrate 10 in an island form so as to correspond to each pixel, and the lower electrode 71 is formed so as to have nearly the same shape as the capacitive electrode 300. In this way, the accumulative capacitance 70 does not uselessly expand in plan view, i.e., not reduce the pixel aperture ratio, while realizing the maximum capacitance under the corresponding situation That is, the accumulative capacitance 70 has larger capacitance with a smaller area.

Referring to FIG. 5, the dielectric film 75 is made of, for instance, a relatively thin silicon oxide film, such as an HTO (high temperature oxide) or LTO (low temperature oxide) film, or silicon nitride film with a thickness approximately between 5 and 200 nm. In a case of increasing the accumulative capacitance 70, as long as the reliability of a film can be sufficiently secured, the thinner the dielectric film 75 the better. Referring to FIG. 5, the dielectric film 75 has a double-layered structure of a silicon oxide film 75a in a lower layer and a silicon nitride film 7b in an upper layer. It is possible to increase the capacitance of the accumulative capacitance 70 owing to the silicon nitride film 75b with a relatively large dielectric constant, and at the same time it is possible to reduce or prevent the withstanding strength of the accumulative capacitance 70 from decreasing owing to the silicon oxide film 75a. Thus, it is possible to obtain two reciprocal effects by forming the dielectric film 75 in a double-layered structure.

Also, it is possible to reduce or prevent water from penetrating into the TFT 30 owing to the silicon nitride film 75b. In this way, a relatively long-term operation of a device is made possible without causing a threshold voltage to increase in the TFT 30. Also, while the dielectric film 75 has a double-layered structure in the present exemplary embodiment, it may be configured with a triple-layered structure having, e.g., a silicon oxide film, a silicon nitride film, and a silicon oxide film, or a stacked structure of more layers.

A first interlayer insulating film 41 composed of, for instance, a silicate glass film, such as NSG (non-silicate glass), PSG (phospho-silicate glass), BSG (boro-silicate glass), and BPSG (borophosphosilicate glass), a silicon nitride film, or a silicon oxide film, or preferably NSG is formed over the above-mentioned TFT 30 or gate electrode 3a and the relay electrode 719, and under the accumulative capacitance 70. In the first interlayer insulating film 41, a contact hole 81 to electrically connect a high concentration source region 1d of a TFT 30 and the later-described data line 6a is opened passing through the later-described second interlayer insulating film 42. Also, a contact hole 83 to electrically connect a high concentration drain region 1e of a TFT 30 and a lower electrode 71 composing an accumulative capacitance 70 is opened in the first interlayer insulating film 41.

Moreover, a contact hole 881 to electrically connect a lower electrode 71 as a capacitive electrode on a pixel electric potential side composing an accumulative capacitance 70 and an relay electrode 719 is opened in the first interlayer insulating film 41. Additionally, in the first interlayer insulating film 41, a contact hole 882 to electrically connect an relay electrode 719 and the later-described second relay electrode 6a2 is opened passing through the later-described second interlayer insulating film.

As shown in FIG. 5, since the contact hole 882 is formed in a region other than the accumulative capacitance 70 and a lower electrode 71 is taken out toward the upper layer via a roundabout route, i.e., via an relay electrode 719 of the lower layer followed by the contact hole 882, even when the lower electrode 71 is connected to a pixel electrode 9a of the upper layer, the lower electrode 71 does not need to be wider than the dielectric film 75 and the capacitive electrode 300. Therefore, it is possible to pattern the lower electrode 71, the dielectric film 75, and the capacitive electrode 300 at the same time by a single etching step. This facilitates control of each etching rate of the lower electrode 71, the dielectric film 75, and the capacitive electrode 300, thus making it possible to increase free design of a film thickness or the like.

Also, in a case where a semiconductor layer 1a of a TFT 30 is subjected to hydrotreatment or the like, it is possible to make the hydrogen used in the above-mentioned hydrotreatment to easily reach the semiconductor layer 1a via the opening in the vicinity of the accumulative capacitance 70, since the dielectric film 75 is formed in the same shape as the lower electrode 71 and the capacitive electrode 300 and does not have an enlarged portion.

Also, it may be considered to activate the ion implanted into the polysilicon film composing the semiconductor layer 1a or gate electrode 3a, by performing the firing of approximately 1000° C. for the first interlayer insulating film 41.

A data line 6a is provided in a fourth layer. The data line 6a is formed in a stripe form so as to be identical with the direction where the semiconductor layer 1a of a TFT 30 extends, i.e., to overlap Y direction in FIG. 6. As shown in FIG. 5, the data line 6a has a three-layered structure of sequentially deposited layers from the bottom of aluminum (refer to 41A in FIG. 5), titanium nitride (41TN in FIG. 5), and a silicon nitride film (401 in FIG. 5).

A silicon nitride film is patterned in a little larger size so as to cover the aluminum layer and titanium nitride layer below. The data line 6a includes aluminum as material with a relatively low resistivity, thereby making it possible to smoothly apply an image signal to a TFT 30 and a pixel electrode 9a normally (without delay). Meanwhile, a silicon nitride film which is relatively excellent to prevent water penetration is formed on the data line 6a, thereby making it possible to enhance the moisture-proof of a TFT 30 and thus to prolong the life span. The silicon nitride film is preferably a plasma silicon nitride film.

Also, in the fourth layer, a relay layer 6a1 for a shield layer and a second relay electrode 6a2 are formed of the same film as the data line 6a. As shown in a plan view of FIG. 6, these are not formed so as to have a plane shape continuous with a data line 6a, but formed so as to be separated in patterning. That is, referring to the data line 6a placed on the leftmost side in FIG. 6, an relay layer 6a1 for a shield layer having a tetragon is formed right on the right side, and a second relay electrode 6a2 having a tetragon with a little larger area than the relay layer 6a1 for a shield layer is formed on the right side. The relay layer 6a1 for a shield layer and the second relay electrode 6a2 have a three-layered structure of sequentially deposited layers from the bottom of aluminum, titanium nitride, and a plasma nitride film by the same step as the data line 6a.

The plasma nitride film is patterned in a little larger size to cover the aluminum layer and titanium nitride layer below. The titanium nitride layer acts as a barrier metal to reduce or prevent penetration by etching of the contact holes 803, 804 formed corresponding to the relay layer 6a1 for a shield layer and the second relay electrode 6a2.

Further, a plasma nitride film which is relatively excellent to reduce or prevent water penetration is formed on the relay layer 6a1 for a shield layer and the second relay electrode 6a2, thereby making it possible to enhance the moisture-proof of a TFT 30 and thus prolonging the life span can be realized. The plasma nitride film is preferably a plasma silicon nitride film.

A second interlayer insulating film 42 formed of a silicate glass film, such as, e.g., NSG, PSG, BSG, or BPSG, a silicon nitride film, or a silicon oxide film, or preferably formed by plasma CVD using a TEOS gas is formed over the accumulative capacitance 70 and under the data line 6a. In this second interlayer insulating film 42, a contact hole 81 to electrically connect a high concentration source region 1d of a TFT 30 and a data line 6a is opened, and at the same time a contact hole 801 to electrically connect an relay layer 6a1 for the shield layer and a capacitive electrode 300 as the upper electrode of an accumulative capacitance 70 is opened. Moreover, in the second interlayer insulating film 42, a contact hole 882 to electrically connect the second relay electrode 6a2 and the relay electrode 719 is formed.

In the fifth layer, a shield layer 400 is formed. This shield layer 400 is formed in a lattice shape so as to extend in the X and Y directions respectively in plan view as shown in FIGS. 6 and 7. The portion extending in the Y direction in the figure of the shield layer 400 is formed more widely than the data line 6a so as to cover particularly, the data line 6a. Also, the portion extending in the X direction in the figure has a notch in the vicinity of the center of one side of each pixel electrode 9a in order to secure a region forming the later-described third relay electrode 402.

Also, in the vicinity of the corner of intersectional portion of the shield layer 400 extending in the X and Y directions respectively in FIGS. 6 and 7, a triangle portion is formed to cover the above-mentioned corner portion. By providing this triangle portion in the shield layer 400, the semiconductor layer 1a of a TFT 30 is effectively blocked from light. That is, a light component incident in an oblique direction on the semiconductor layer 1a is reflected or absorbed in this triangle portion, not reaching the semiconductor layer 1a. Thus, it is possible to reduce or prevent the photo-leakage current from occurring and to display a high quality image without flicker.

This shield layer 400 is provided to extend from an image displaying region 10a where a pixel electrode 9a is disposed to the periphery thereof, and is electrically connected to a constant voltage source, so it is held at a fixed potential. The constant voltage source may be a positive or negative constant voltage source applied to the later-described data line driving circuit 101, or a constant voltage source applied to a counter electrode 21 of a counter substrate 20.

Owing to the shield layer 400 which is formed to cover the entire data line 6a (refer to FIG. 7) and at the same time which is held at a fixed electric potential, it is possible to remove the effect of a capacitive coupling created between the data line 6a and the pixel electrode 9a. That is, it is possible to reduce or prevent the electric potential of the pixel electrode 9a from varying in advance, in response to the electrical conduction to a data line 6a, thereby reducing the possibility of creating the image stain or the like on the image caused by the data line 6a. Since the shield layer 400 is formed in a lattice shape, it is possible to reduce or prevent a useless capacitive coupling from occurring in a portion where a scan line 11a extends.

In the fourth layer, a third relay electrode 402 is formed as a relay layer of the same film as the shield layer 400. The third relay electrode 402 acts as a medium for electrical connection between the second relay electrode 6a2 and the pixel electrode 9a via the later-described contact hole 89.

The shield layer 400 and the third relay electrode 402 are not formed so as to have a continuous plane shape, but formed so as to be separated in patterning.

Meanwhile, the above-mentioned shield layer 400 and the third relay electrode 402 have a second-layered structure of a layer made of aluminum in the lower layer and a layer made of titanium nitride in the upper layer. In the third relay electrode 402, the aluminum layer at the lower layer is connected to the second relay electrode 6a2, and the titanium nitride layer at the upper layer is connected to the pixel electrode 9a made of ITO or the like. When aluminum and ITO are directly connected to each other, the electrical corrosion occurs therebetween so that a preferable electrical connection is not achieved due to the disconnection of aluminum or the insulation caused by formation of alumina. To deal with this, in this exemplary embodiment, it is possible to achieve a low contact resistance and a good connection performance by connecting the titanium nitride and ITO.

By realizing a good electrical connection of third relay electrode 402 and the pixel electrode 9a, it is possible to keep a stable application of voltage to the pixel electrode 9a or a good electric potential retaining characteristic in the pixel electrode 9a.

The shield layer 400 and the third relay electrode 402 include aluminum which is relatively excellent for light reflection function and include titanium nitride which is relatively excellent for light absorption function, thereby acting as a light shielding layer. That is, owing to these, it is possible to block a light component incident on the semiconductor layer 1a of a TFT 30 (see FIG. 5) even from the upper side. Also, such a light shielding function can be equally applied to the above-mentioned capacitive electrode 300 and data line 6a as well. The shield layer 400, the third relay electrode 402, the capacitive electrode 300, and the data line 6a compose a portion of a stacked structure provided on a TFT substrate 10, acting as a light shielding film of the upper side for blocking light incident on a TFT 30 from the upper side.

A third interlayer insulating film 43 composed of a silicate glass film, such as NSG, PSG, BSG, or BPSG, a silicon nitride film, or a silicon oxide film, or preferably formed by plasma CVD using TEOS gas is formed over the data line 6a and under the shield layer 400. In this third interlayer insulating film 43, a contact hole 803 to electrically connect the shield layer 400 and the relay layer 6al for a shield layer is opened, and a contact hole 804 to electrically connect the third relay electrode 402 and the second relay electrode 6a2 is opened.

The stress occurring in the vicinity of the interface of the capacitive electrode 300 may be reduced by not performing the above-mentioned firing which is performed for the first interlayer insulating film 41 with regard to the second interlayer insulating film 42.

In the sixth layer, the pixel electrode 9a is formed in a matrix form as described above, and an alignment film 16 is formed on the pixel electrode 9a. Thus, the fourth interlayer insulating film 44 composed of a silicate glass film, such as NSG, PSG, BSG, or BPSG, a silicon nitride film, or a silicon oxide film, or preferably BPSG is formed under the pixel electrode 9a. In this fourth interlayer insulating film 44, a contact hole 89 to electrically connect the pixel electrode 9a and the third relay electrode 402 is opened. According to this exemplary embodiment, the surfaces of the third and the fourth interlayer insulating films 43, 44 are planarized by CMP (chemical mechanical polishing), and the defects in alignment of the liquid crystal layer 50 caused by the step difference by a variety of wires or elements existing on the lower side is reduced. However, instead of planarizing the third and fourth interlayer insulating films 43, 44 by CMP, a planarization step may be also performed by forming a trench in at least one of the TFT substrate 10, the basic insulating film 12, the first interlayer insulating film 41, the second interlayer insulating film 42, and the third interlayer insulating film 43, and then burying the wires like the data line 6a or a TFT 30.

Also, the accumulative capacitance 70 has a three-layered structure of sequentially stacked layers from the bottom of a capacitive electrode on a pixel electric potential side, a dielectric film, and a capacitive electrode on a fixed electric potential side, but it may have the reverse structure.

As shown in FIGS. 2 and 3, a light shielding film 53 is formed in the counter substrate 20 in a frame shape partitioning a display region. In the entire surface of the counter substrate 20, a transparent conductive film, such as ITO is formed as a counter electrode 21, and in the entire surface of a counter electrode 21, a polyimide base alignment film 22 is formed. The alignment film 22 is subjected to a rubbing step in a predetermined direction so that liquid crystal molecules are aligned at a predetermined pretilt angle.

A sealing material 52 for filling liquid crystal is formed between a TFT substrate 10 and a counter substrate 20 in the outside region of the light shielding film 53. The sealing material 52 is disposed to be nearly accord with the profile of the counter substrate 20, sticking the TFT substrate 10 and the counter substrate 20 together.

The sealing material 52 is applied on the TFT substrate 10 except for a portion of the one side of the TFT substrate so that a liquid crystal inlet 108 is formed to inject the liquid crystal 50 into a gap between the TFT substrate 10 and the counter substrate 20 which are adhered. After injecting the liquid crystal through the liquid crystal inlet 108, the liquid crystal inlet 108 is sealed with sealing material 109.

In the outside region of the sealing material 52, a data line driving circuit 101 for driving the data line 6a by supplying an image signal to the data line 6a on a predetermined timing and an external connecting terminal 102 for connecting with the external circuits are provided along one side of the TFT substrate 10. Along two sides adjacent to this side, a scan driving circuit 104 is provided for driving a gate electrode 3a by supplying a scan signal to the scan line 11a and the gate electrode 3a on a predetermined timing. The scan line driving circuits 104 are formed on the TFT substrate 10 in positions facing each other in the light shielding film 53 inside the sealing material 52. Also, on the TFT substrate 10, wires 105 for connecting the data line driving circuit 101, the scan line driving circuit 104, the external connecting terminal 102, and the conducting terminal 107 for conducting the upper and lower sides are provided to face each other in the three sides of the light shielding film 53.

The upper/lower conducting terminal 107 is formed at four corners of the sealing material 52 on the TFT substrate 10. Between the TFT substrate 10 and the counter substrate 20, the upper/lower conducting material 106 is provided, its lower portion being connected to the upper/lower conducting terminal 107 and its upper portion being connected to the counter electrode 21, thereby achieving the electrical conduction between the TFT substrate 10 and the counter substrate 20 through the upper/lower conducting material 106.

The present invention is not limited to the above-mentioned exemplary embodiments with reference to the cubic/plane layout of each component, but embodied in a variety of modifications.

FIG. 1 shows a portion of film formation patterns of a plurality of film formation layers in a pixel region (element forming region) on the left side, and a wiring layer region other than the element forming region, e.g., a wire portion 105 on the right side. In FIG. 1, the configuration of the element forming region is the same as in FIG. 5. In the wiring layer region, active elements like a transistor or passive elements like a capacitor are not originally formed, but only the wire 105 is formed.

In FIG. 1, the wire 105 is made of the same material as the second relay layer 6a2 in the wiring layer region in the forming step of a fourth layer including the second relay layer 6a2 of the pixel region. The third interlayer insulating film 43 is formed on the wire 105, and a terminal 121 is formed on the third interlayer insulating film 43 by the same step as the fifth layer of the pixel region. That is, a terminal 121 is made of the same material as the shield line 400. As described above, the third interlayer insulating layer 43 is planarized by CMP.

The wire 105 and the terminal 121 are electrically connected via a contact hole 113 formed in the third interlayer insulating film 43. In the wiring layer region of FIG. 1, a film formation layer is not formed in the upper layer of the terminal 121.

In this exemplary embodiment, on the TFT substrate 10, a predetermined dummy pattern 122 using the same material as a scan line 11a is formed in the wiring layer region under the contact hole 113 with regard to the forming step of the scan line 11a as the first layer of the pixel region.

On a basic insulating film 12, a predetermined dummy pattern 123 using the same material as the relay electrode 719 is formed in the wiring layer region under the contact hole 113 with regard to the forming step of the relay electrode 719 as the second layer of the pixel region. That is, under the contact hole 113, a dummy pattern 122, a basic insulating film 12, a dummy pattern 123, a first interlayer insulating film 41, and a second interlayer insulating film 42 are formed on the TFT substrate 10, and a dummy pattern 122 and a dummy pattern 123 are formed in the same step as the scan line 11a and the relay electrode 719 respectively, resulting in the same film thickness.

Therefore, the second relay layer 6a2 surface right under the contact hole 804 of the pixel region and the wire 105 surface right under the contact hole 113 are equal in vertical position. The forming regions of the contact holes 804 and 113 in the third interlayer insulating film are equal in thickness and the contact holes 804 and 113 are equal in depth, since the third interlayer insulating film where the contact hole 113 of the wiring layer region is formed is planarized.

Manufacturing Process

Reference will now be made to the exemplary embodiments of a method of manufacturing liquid crystal device according to the present invention in conjunction with FIGS. 1, 8–10. FIG. 1 shows sectional views of a pixel region and a wiring region, FIGS. 8 and 9 show manufacturing steps in a pixel region according to the order of processing, and FIG. 10 shows a flow chart indicating a manufacturing method.

Figure 10:
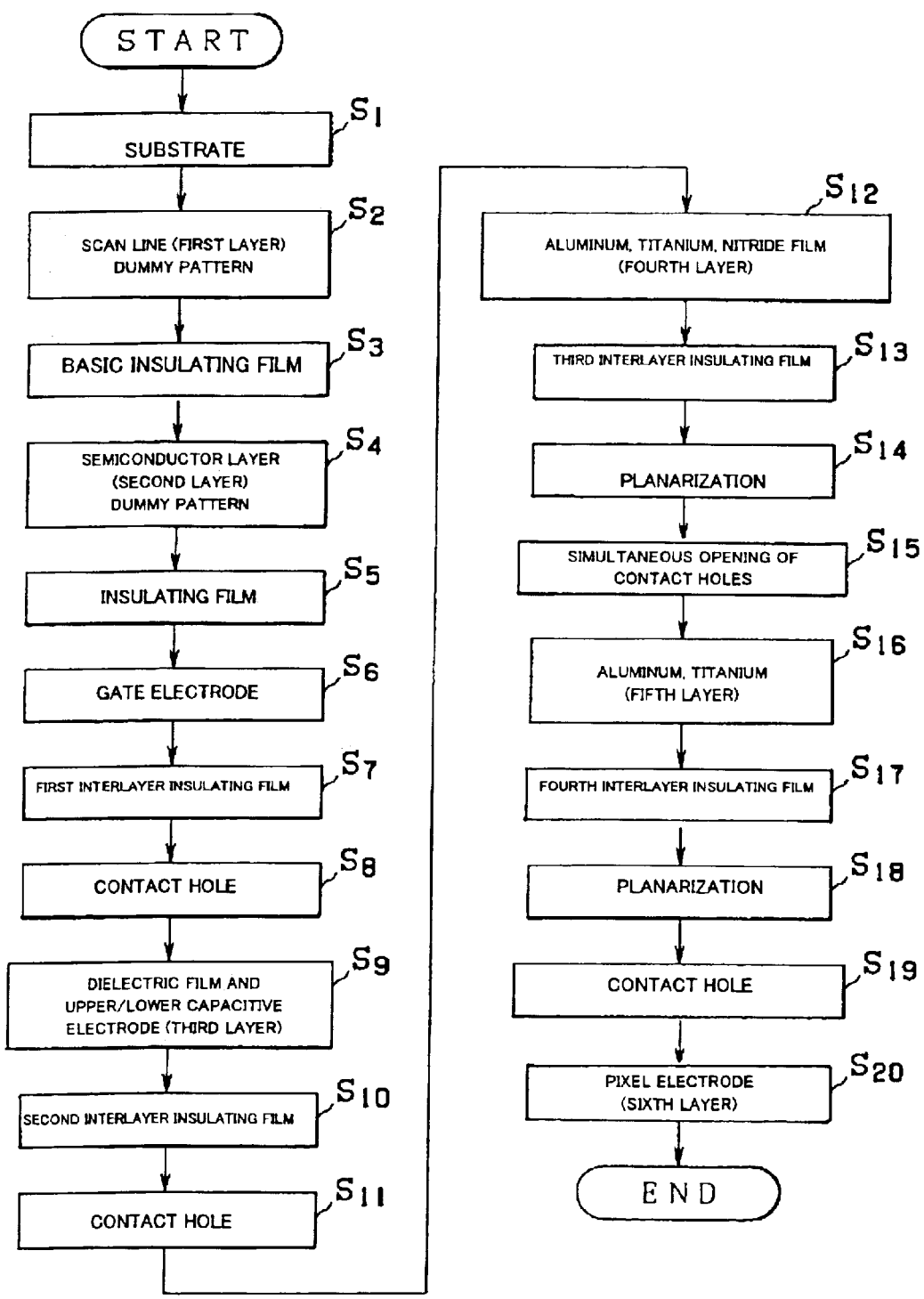
FIG. 10 is a flow chart showing a manufacturing method.

First, as shown in step (1) of FIG. 8, a TFT substrate 10, such as quartz, glass, or silicon substrate is prepared (step S1 in FIG. 10). The substrate is preferably subjected to an annealing step at high temperatures ranging from approximately 900 to 1300° C. in an inert gas ambient like N (nitrogen) so that a little distortion occurs on a TFT substrate 10 due to a high temperature step to be performed later.

Next, in the entire surface of the TFT substrate 10 thus stepped, metal such as Ti, Cr, W, Ta, or Mo, or metal alloy film, such as metal silicide is deposited by sputtering at a film thickness of approximately 100–500 nm, preferably 200 nm. Hereinafter, such a film before patterning is referred to as a precursor film. The precursor film of metal alloy film is then patterned by photolithography and etching resulting in formation of a scan line 11a of a stripe shape in plan view (step S2).

In this exemplary embodiment, a dummy pattern 122 is formed of the film formation material of a scan line 11a on a basic insulating film 12 of a wiring layer region when forming the scan line 11a of the first layer. The scan line 11a and the dummy pattern 122 are equal in film thickness.

Next, on the scan line 11a, a basic insulating film 12 made of a silicate glass film, such as NSG (non-silicate glass), PSG (phospho-silicate glass), BSG (boro-silicate glass), or BPSG (borophosphosilicate glass), a silicon nitride film, or a silicon oxide film is formed using TEOS (tetraethylorthosilicate) gas, TEB (tetraethylborate) gas, or TMOP (tetramethyloxyphosphate) gas by an atmospheric pressure method or a low pressure CVD method (step S3). The basic insulating film 12 is, e.g., approximately 500–2000 mn thick.

In next step S4, a semiconductor layer 1a of the second layer is formed. The precursor film of the semiconductor layer 1a is an amorphous silicon film formed on the basic insulating film 12 by a low pressure CVD (e.g., CVD at a pressure of approximately 20–40 Pa) using monosilane or disilane gas at a flow rate of approximately 400–600 cc/min under the ambient of relatively low temperatures ranging from approximately 450 to 550° C., preferably approximately 500° C. A p-Si (polysilicon) film is then solid-phase grown until its thickness reaches approximately 50–200 nm, preferably approximately 100 nm, by performing heat treatment for approximately 1–10 hours, preferably 4–6 hours, at temperatures ranging from approximately 600 to 700° C. in N ambient. The solid phase growth method may be the annealing using RTA or the laser anneal using excimer laser. At this time, a little V or III group element may be doped in such a way as ion implantation technique depending on the type of a TFT 30 for pixel switching, i.e., a n-channel or p-channel type. A semiconductor layer 1a with a predetermined pattern is then formed by photolithography and etching.

Next, in step S5, as shown in step (2) of FIG. 8, a lower layer gate insulating film is formed by thermal oxidizing the semiconductor layer 1a composing a TFT 30 at temperatures ranging from approximately 900 to 1300° C., preferably approximately 1000° C., and in some cases, an upper layer gate insulating film is subsequently formed by performing a low-pressure CVD resulting in the formation of an insulating film 2 composed of a one-layered or multi-layered high temperature silicon oxide film (HTO film) or silicon nitride film (including a gate insulating film). Consequently, the semiconductor layer 1a is approximately 30–150 nm thick, preferably 35–50 nm, and the insulating film 2 is approximately 20–150 nm thick, preferably approximately 30–100 mn.

Next, in order to control a threshold voltage Vth of the TFT 30 for pixel switching, only a predetermined amount of a dopant, such as boron is doped into an n-channel or p-channel region of the semiconductor layer 1a by ion implantation or the like.

A trench 12cv connected to a scan line 11a is then formed in the basic insulating film 12. This trench 12cv is formed by dry etching, such as reactive ion etching or reactive ion beam etching.

Next, as shown in step (3) of FIG. 8, a polysilicon film is deposited by lower pressure CVD, and is made conductive by the thermal diffusion of phosphorous (P). Instead of this thermal diffusion, a doped silicon film may be used which is formed by introducing P ion simultaneously in the formation of the polysilicon film. The polysilicon film is approximately 100–500 mn thick, preferably approximately 350 nm. By photolithography and etching, a predetermined pattern of gate electrode 3a is then formed including a gate electrode portion of TFT 30 (step S6). In forming the gate electrode 3a, a sidewall 3b provided to extend in the gate electrode is also formed at the same time. The sidewall 3b is formed by depositing the above-mentioned polysilicon film even inside the trench 12cv. At this time, since the bottom of the trench 12cv is in contact with the scan line 11a, the sidewall 3b and the scan line 11a are electrically connected to each other. Moreover, in patterning the gate electrode 3a, simultaneously with this, an relay electrode 719 is also formed. By this patterning, the relay electrode 719 is formed to have a plane shape as shown in FIG. 6.

A low concentration source region 1b, a low concentration drain region 1c, a high concentration source region 1d, and a high concentration drain region 1e are then formed in the semiconductor layer 1a.

In a case where a TFT 30 is formed of an n-channel type TFT having a LDD structure, specifically firstly, dopant of V group element, such as P is doped at a low concentration (e.g., P ion at a dose of $1-3 \times 10^{13}/cm^2$) using the gate electrode 3a as a mask in order to form a low concentration source region 1b and a low concentration drain region 1c. This causes the semiconductor layer 1a under the gate electrode 3a to become a channel region 1a'. At this time, as the gate electrode 3a acts as a mask, the low concentration source region 1b and the low concentration drain region 1c are formed in a self-aligned manner. A resist layer with a wider plane pattern than the gate electrode 3a is then formed on the gate electrode 3a in order to form the high concentration source region 1d and high concentration drain region 1e. Dopant of V group element like P is then doped at a high concentration (e.g., P ion at a dose of $1-3 \times 10^{15}/cm^2$).

However, the doping is not necessarily performed with by two steps of low concentration and high concentration doping. For instance, a TFT of a offset structure may be formed without performing low concentration doping, and a self-aligned TFT may be formed using the gate electrode 3a (gate electrode) as a mask by an ion implantation technique using P or B ion. By doping impurities, the gate electrode 3a has a lower resistance.

According to this exemplary embodiment, in the forming step of the second layer, a predetermined dummy pattern 123 is made of the same material as the relay electrode 719 of the second layer in the wiring layer region. The dummy pattern 123 has the same film thickness as the relay electrode 719.

Next, as shown in step (4) of FIG. 8, the first interlayer insulating film 41 composed of a silicate glass film, such as NSG, PSG, BSG, or BPSG, a silicon nitride film, or a silicon oxide film is formed on the gate electrode 3a by atmospheric pressure or lower pressure CVD, for instance, using TEOS, TEB, or TMOP gas (step S7). The first interlayer insulating film 41 is, for instance, approximately 500–2000 nm thick. Preferably, the first interlayer insulating film 41 is subjected to the annealing step at a high temperature of approximately 800° C., thus enhancing the film quality.

In step S8, a contact hole 83 and a contact hole 881 are opened by dry etching, such as reactive ion etching or reactive ion beam etching, for the first interlayer insulating film 41. At this time, the former is formed to be in contact with the high concentration drain region 1e of the semiconductor layer 1a, and the latter is formed to be in contact with the relay electrode 719.

Next, in step S9 as shown in step (5) of FIG. 8, a metal film like Pt or a polysilicon film is formed on the first interlayer insulating film 41 at a thickness between approximately 100 and 500 nm by low pressure CVD or sputtering, thereby forming a precursor film of lower electrode 71 with a predetermined pattern. In this case, the formation of a metal film is performed to fill both contact hole 83 and contact hole 881, thereby achieving the electrical connection between the high concentration drain region 1 e/the relay electrode 719 and the lower electrode 71.

Subsequently, a precursor film of the dielectric film 75 is then formed on the lower electrode 71. This dielectric film 75 may be formed by a variety of related arts which are generally used to form a TFT gate insulating film, similarly to the case of insulating film 2. The silicon oxide film 75a is formed by the above-mentioned thermal oxidation or CVD, and the silicon nitride film 75b is then formed by low pressure CVD. The thinner the dielectric film 75, the larger the accumulative capacitance 70. Thus, preferably a very thin insulating film not more than 50 nm in the film thickness should be formed on the condition that defects like film breakdown do not occur. A polysilicon film or a metal film like Al is then formed on the dielectric film 75 at a thickness between approximately 100 and 500 nm by low pressure CVD or sputtering, thereby forming a precursor film of the capacitive electrode 300.

Next, in step (6) of FIG. 9, the precursor film of the lower electrode 71, the dielectric film 75, and the capacitive electrode 300 is patterned at the same time to form the lower electrode 71, the dielectric film 75, and the capacitive electrode 300, thereby completing the accumulative capacitance 70.

Next, as shown in step (7) of FIG. 9, the second interlayer insulating film 42 composed of a silicate glass film, such as NSG, PSG, BSG, or BPSG, a silicon nitride film, or a silicon oxide film is formed, for instance, by atmospheric pressure or low pressure CVD using TEOS gas, etc., preferably by plasma CVD (step S10). When aluminum is used in the capacitive electrode 300, it is necessary to form a film at a low temperature by plasma CVD. The second interlayer insulating film 42 is, for instance, approximately 500–1500 nm thick.

Next, in step S11, the contact holes 81, 801, and 882 are opened by dry etching, such as reactive ion etching or reactive ion beam etching for the second interlayer insulating film 42. At this time, the contact hole 81 is formed to be in contact with the high concentration source region 1d of the semiconductor layer 1a, the contact hole 801 is formed to be in contact with the capacitive electrode 300, and the contact hole 882 is formed to be in contact with the relay electrode 719, respectively.

In step S12 as shown in step (8) of FIG. 9, a low resistivity metal like aluminum or a metal silicide with a light blocking property composing the fourth layer is deposited as a metal film in the entire surface of the second interlayer insulating film 42 at a thickness between approximately 100 and 500 nm, preferably approximately 300 nm, by sputtering. The data line 6a with a predetermined pattern is then formed by photolithography and etching. At this time, in the patterning, the relay layer 6a1 for the shield layer and the second relay layer 6a2 are also formed simultaneously. The relay layer 6a1 for the shield layer is formed to cover the contact hole 801, and the second relay layer 6a2 is formed to cover the contact hole 882.

Next, the film made of a titanium nitride is formed in the entire surface of the layer over these by plasma CVD, and is then patterned so as to remain only on the data line 6a (refer to 41 TN in step (8) of FIG. 9). However, the layer made of the titanium nitride may be formed so as to remain in the relay layer 6a1 for the shield layer and the second relay layer 6a2 as well, and, in some cases, may be formed so as to remain in the entire surface of a TFT substrate 10. Also, the film formation may be performed simultaneously with the formation of an aluminum film and then etching may be performed altogether.

In the forming step of the second relay layer 6a2 of the fourth layer, the wiring layer region is also patterned with the same material as the second relay layer 6a2, thereby forming the wire 105. This wire 105 is made of the same material as the second relay layer 6a2, i.e., aluminum in the bottom layer, titanium nitride in the middle layer, and silicon nitride in the top layer, resulting in the same film thickness as the second relay layer 6a2.

Next, as shown in step (9) of FIG. 9, the third interlayer insulating film 43 composed of a silicate glass film, such as NSG, PSG, BSG, or BPSG, a silicon nitride film, or a silicon oxide film is formed so as to cover the data line 6a, etc., for instance, by atmospheric pressure or lower pressure CVD using TEOS gas or the like, or preferably plasma CVD capable of forming a film at a low temperature (step S13). The third interlayer insulating film 43 is, for instance, approximately 500–3500 nm thick.

In step S14 as shown in FIG. 5, the third interlayer insulating film 43 is planarized, for instance, by CMP. This causes the third interlayer insulating film 43 to considerably vary in thickness depending on its position corresponding to the film formation pattern of each layer.

Next, in step S15, the contact holes 803 and 804 are opened by dry etching, such as reactive ion etching or reactive ion beam etching for the third interlayer insulating film 43. At this time, the contact hole 803 is formed to be in contact with the relay layer 6a1 for the shield layer, and the contact hole 804 is formed to be in contact with the second relay layer 6a2, respectively.

Also, in this exemplary embodiment, the contact hole 113 is formed in the wiring layer region simultaneously in making the contact holes 803, 804. Under the contact hole 804, a scan line 11a, a basic insulating film 12, an relay electrode 719, a first interlayer insulating film 41, and a second interlayer insulating film 42 are formed on a TFT substrate 10, and under the contact hole 113, a dummy pattern 122, a basic insulating film 12, a dummy pattern 123, a first interlayer insulating film 41, and a second interlayer insulating film 42 are formed on a TFT substrate 10. The dummy pattern 122 and the dummy pattern 123 have the same film thickness as the scan line 11a and the relay electrode 719 respectively, and the second relay layer 6a2 and the wire 105 have the same film thickness. Therefore, the second relay layer 6a2 surface right under the contact hole 804 and the wire 105 surface are equalized to each other in vertical position.

That is, the third interlayer insulating film 43 is formed nearly at the same thickness in the forming portion of the contact holes 803, 804, 113, so that the contact holes 803, 804, 113 have nearly the same depth. Thus, the contact holes 803, 804, 113 are opened simultaneously by the substantially same etching step. That is, contact holes 803, 804, 113 are surely formed by a single etching step.

Next, in step S16, a fifth layer shield layer 400 is formed on the third interlayer insulating film 43 by sputtering or plasma CVD.

First, a lower layer film is made of a low resistivity material, for instance, aluminum on the third interlayer insulating film 43, the upper layer film which is on the lower layer film, is then made of a material which will not cause electrical corrosion with ITO composing the later-described pixel electrode 9a to be described later, for instance, titanium nitride, etc., and finally, the lower layer film and the upper layer film are patterned together resulting in formation of a shield layer 400 with a two-layered structure. At this time, the third relay electrode 402 is also formed with the shield layer 400.

In this exemplary embodiment, a terminal 121 is formed using the same material as the fifth layer shield layer 400 in the wiring layer region. The shield layer 400 is made of aluminum in the lower layer and of titanium nitride in the upper layer, so the terminal 121 is also made of these wire materials.

Next, in the pixel region, a fourth interlayer insulating film 44 composed of a silicate glass film, such as NSG, PSG, BSG, or BPSG, a silicon nitride film, or a silicon oxide film is formed, for instance, by atmospheric pressure or low pressure CVD using TEOS gas or the like (step S17). The fourth interlayer insulating film 44 is, for instance, approximately 500–1500 nm thick.

In step S18 as shown in FIG. 5, the fourth interlayer insulating film 44 is planarized, for instance, by CMP. The contact hole 89 is then opened by dry etching, such as reactive ion etching or reactive ion beam etching with regard to the fourth interlayer insulating film 44 (step S19). At this time, the contact hole 89 is formed to be in contact with the aforementioned third relay electrode 402.

Next, the transparent conductive film like an ITO film is deposited on the fourth interlayer insulating film 44 at a thickness between approximately 50 and 200 nm by sputtering. The pixel electrode 9a is then formed by photolithography and etching (step S20).

When the present electro-optical device is used as a reflective type, the pixel electrode 9a may be made of opaque material with a high reflectance ratio like aluminum. The alignment film 16 is then formed by applying the coating solution for the polyimide base alignment film on the pixel electrode 9a and then performing a rubbing step to have a predetermined pretilt angle in a predetermined direction.

Meanwhile, in the counter substrate 20, a glass substrate or the like is firstly prepared, and the light shielding film 53 as a frame is then formed, for instance, by sputtering metal chrome and then performing the photolithography and etching. The light shielding film 53 does not need to be conductive, and may be made of a material, such as black resin where carbon or Ti is scattered in the photoresist, in addition to metal material like Cr, Ni, Al, or the like.

Next, the transparent conductive film, such as ITO is deposited in the entire surface of the counter substrate 20 by sputtering at a thickness between approximately 50 and 200 nm, thereby forming the counter electrode 21. Moreover, the alignment film 22 is formed by applying a coating solution for a polyimide base alignment film on the entire surface of the counter electrode 21 and then performing a rubbing step to have a predetermined pretilt angle in a predetermined direction.

Finally, as shown in FIGS. 2 and 3, the TFT substrate 10 and the counter substrate 20 where each layer is formed are stuck together, for instance, by the sealing material 52 with the alignment films 16 and 22 opposing to each other after providing the sealing material 52 along the four sides of the counter substrate 20 and at the same time forming the upper/lower conducting materials 106 at four corners of the sealing material 52. The upper/lower conducting materials 106 are in contact with the terminal 121 of the TFT substrate 10 on the lower side and is in contact with the common electrode 21 of the counter substrate 20 on the upper side, thereby making an electrical conduction between the TFT substrate 10 and the counter substrate 20. A predetermined thickness of liquid crystal layer 50 is then formed, for instance, by absorbing the liquid crystal formed by mixing a plurality of kinds of nematic liquid crystals in the gap between both substrates by the vacuum suction or the like.

Also, the sealing material 52 is made of, for instance, UV curable resin, thermal curable resin, or the like in order to stick both substrates together, and is hardened by ultraviolet ray, heating, or the like. When the liquid crystal device according to this exemplary embodiment is, for instance, applied to a liquid crystal device for a projector which is compact and magnifies display, gap material (spacer), such as glass fiber or glass bead is scattered in the sealing material 52 in order to provide spacing (gap between both substrate) between both substrates by a predetermined value. When the liquid crystal device is, for instance, applied to the liquid crystal device for a liquid crystal display or liquid crystal TV which is of a large size and displays at an equal magnification, the above-mentioned gap material may be included among the liquid crystal layer 50.

If the delay in the scan signal applied to the scan line 11a and the gate electrode 3a does not matter, the scan line driving circuit 104 may be provided on one side only. Also, the data line driving circuit 101 may be provided on both sides along the periphery of the image displaying region 10a.

Further, on the TFT substrate 10, a sampling circuit to apply an image signal to the data line driving circuit 101, the scan line driving circuit 104, and a plurality of data lines 6a on a predetermined timing, a precharge circuit to apply a predetermined voltage level of precharge signals to a plurality of data lines 6a respectively in advance of an image signal, and a test circuit to check the quality or defect of the electro-optical device during the manufacture or shipment may be formed.

In the above-mentioned respective exemplary embodiments, instead of preparing the data line driving circuit 101 and the scan line driving circuit 104 on the TFT substrate 10, for instance, it may be electrically and mechanically connected to LSI for driving mounted on TAB (tape automated bonding) substrate through an anisotropic conductive film provided in the periphery of the TFT substrate 10. On the sides where the projection light is incident in the counter substrate 20 and the emitted light is emitted in the TFT substrate 10, a polarizing film, a retardation film, and a polarizer are provided in a predetermined direction corresponding to, for instance, operating modes, such as TN (twisted nematic) mode, VA (vertically aligned) mode, or PDLC (polymer dispersed liquid crystal) mode, or normally-white mode/normally-black mode, respectively.

According to this exemplary embodiment, in a plurality of contact holes forming regions of the interlayer insulating film planarized by CMP, every pattern is formed of the same film formation material under the sub-interlayer-film wiring pattern beneath the interlayer insulating film which are all planarized. In this way, the surface of every sub-interlayer-film wiring pattern has an equal vertical position, thus the planarized interlayer insulating film has the same thickness in every contact hole forming region.

By making the contact holes equal in depth, these contact holes are surely simultaneously opened by performing an etching step once. Also, since the vertical position of the sub-interlayer-film wiring pattern is controlled relatively high by forming the dummy pattern, the depth of contact hole becomes relatively short. Thus the aspect ratio becomes low, thereby enhancing the contact characteristics.

A plurality of contact holes formed in the planarized interlayer insulating film are preferably simultaneously opened by performing an etching step once, and it does not matter if several contact holes are removed more by over-etching. That is, considering the selection ratio of the interlayer insulating film to the sub-interlayer-film wiring pattern and the thickness of the sub-interlayer-film wiring pattern, it does not matter if the vertical positions of surfaces of the sub-interlayer-film wiring patterns are different from each other. Thus, it is quite apparent that the dummy pattern does not need to be prepared so that the same film formation layer is sure to be formed on the lower side of each contact hole, and that the pattern by different film formation layers may be formed on the lower side of these contact holes. That is, the sums of film thicknesses of the film formation layers stacked under each contact hole forming region has only to be configured to be made equal. Moreover, if it falls within the permissible range of the over-etching, it does not matter if the sub- interlayer-film wiring patterns beneath each contact hole forming region are a little different in vertical position from each other.

Also, even though an electrical characteristic of a dummy pattern has not been set forth in each exemplary embodiment, the dummy pattern may be, for instance, held in the floating potential or in a different potential by connecting wires, or, for instance, may be held in the same potential as a contact hole by connecting to a contact hole.

Even though there have been disclosed exemplary embodiments in which the vertical position of the surface of the sub-interlayer-film wiring pattern is defined by forming a dummy pattern on the lower side, it is possible to obtain the same effect by cutting and reducing the portion other than the contact hole forming region formed in the planarized interlayer insulating film. For instance, the substrate surface may be cut or the interlayer insulating film may be cut. In this way, it is possible to control the depth of each contact hole, and to make the depth of each contact hole relatively short and equal.

Even though there have been disclosed exemplary embodiments in which the height of the sub-interlayer-film wiring pattern in a pixel region is equalized with the height of wire in the wiring layer region to each other by forming a dummy pattern, the above-mentioned exemplary embodiment may be also applied to a case of controlling the vertical positions of a plurality of sub-interlayer-film wiring patterns in the same film formation layer within a pixel region. Further, the same effects as in dummy pattern may be obtained by extending or not extending the existing pattern to the bottom of contact hole, instead of newly forming the dummy pattern.

Herein, the essential effect of an aspect of the present invention is that the depths of the plurality of contact holes formed in the interlayer film are made equal or nearly equal even after planarizing the interlayer film by CMP. In order to achieve such an effect, it is important to equalize the heights from a certain base level of the TFT substrate surface over the entire region of TFT substrate in the sub-interlayer-film wiring pattern forming the contact hole. Exemplary embodiments have also disclosed that, in order to achieve such effect, the height is controlled by forming a dummy pattern under the sub-interlayer-film wiring pattern within a wiring layer region, and the height of a sub-interlayer-film wiring pattern within a wiring layer region is formed to be equalized to that of the sub-interlayer-film wiring pattern within a pixel region. There is also a method of controlling the height by cutting a substrate surface within a pixel region or an interlayer insulating film surface of a pixel region, and equalizing the height of a sub-interlayer-film wiring pattern within a pixel region to that of the sub-interlayer-film wiring pattern within a wiring layer region. The common essential requirement of configuration for the above-mentioned effect of an aspect of the present invention is to equalize the distances (heights) along the normal direction from a certain base level of the TFT substrate surface over the entire region of the TFT substrate in the sub-interlayer-film wiring pattern forming the contact hole. In this way, even after planarizing the interlayer film by CMP, the depths of the plurality of contact holes formed on the interlayer film over the entire surface of the TFT substrate are made equal or nearly equal, thus making it possible to open all contact holes uniformly by performing an interlayer-film removal step once. Therefore, the essential requirement of configuration of an aspect of the present invention is to equalize the sums of the thicknesses of the stacked films under the sub-interlayer-film wiring pattern forming the contact hole with regard to the contact holes formed over the entire region of the TFT substrate. More generally, it is to make equal the values obtained by subtracting the sunken distance along the normal direction from the base level of the TFT substrate surface from the sums of the thicknesses of the stacked films under the sub-interlayer-film wiring pattern forming the contact holes. The sunken distance along the normal direction from the base level of the TFT substrate surface refers to the depth of the recess of the recess region measured by setting the original surface of the substrate, i.e., the highest surface of the substrate as a base level, wherein the recess is formed due to, for example, etching.

Even though the substrate for the liquid crystal device has been set forth in the exemplary embodiment, it is possible to apply to the semiconductor substrate having the planarized interlayer film, e.g., substrates of the electroluminescent device or electrophoresis device as well.

Electronic Apparatus

Figure 11:
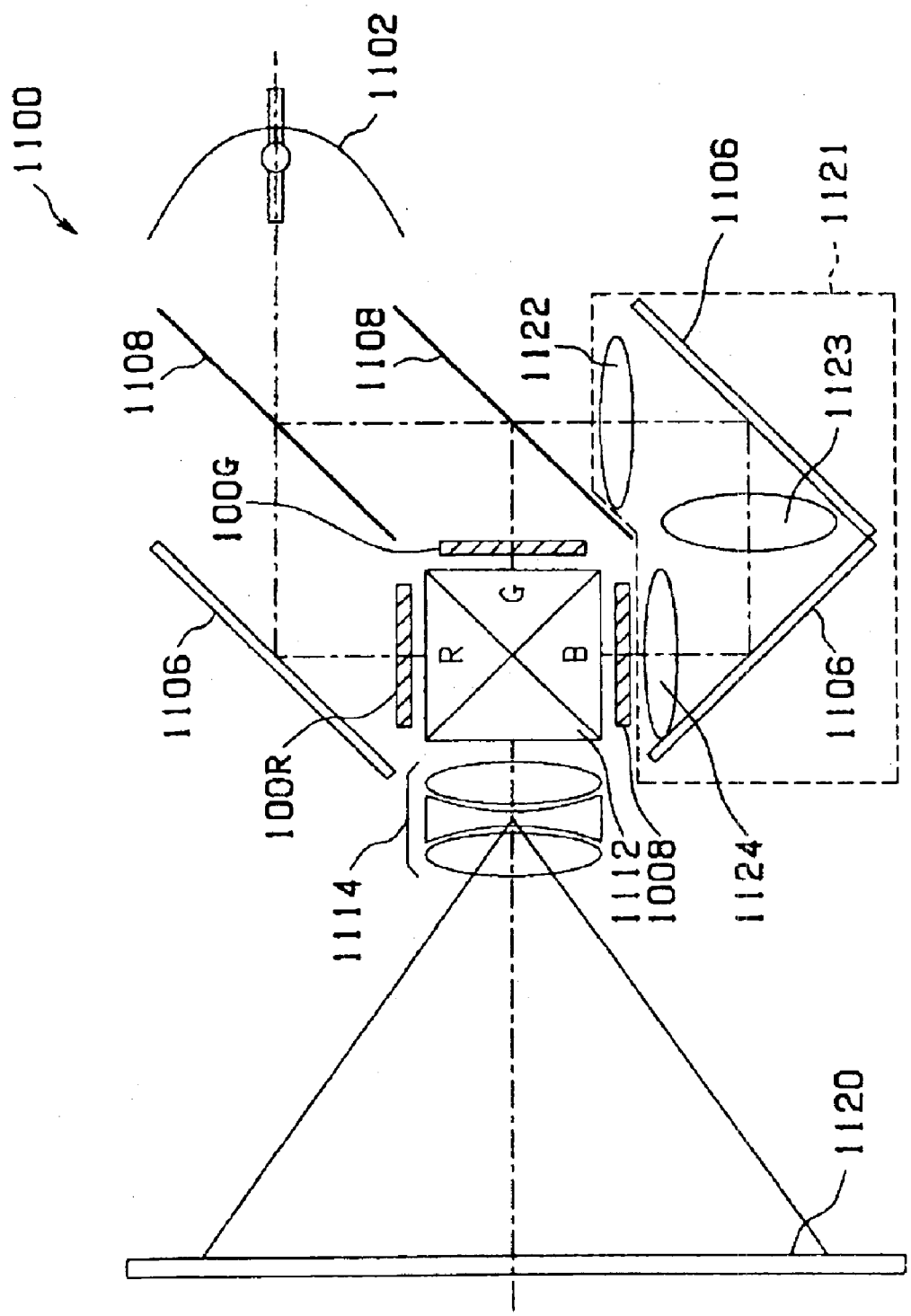
FIG. 11 is a schematic sectional view showing a projection color display.

Reference will now be made to the exemplary embodiment and the entire configuration, especially, optical configuration of the projection color display as an example of the electronic apparatus for using the above-mentioned electro-optical device as a light bulb. FIG. 11 is a schematic sectional view showing the projection color display.

In FIG. 11, the liquid crystal projector 1100 as an example of the projection color display according to this exemplary embodiment is configured as a projector which includes three liquid crystal modules including a liquid crystal device where a driving circuit is mounted on the TFT array substrate, and uses these modules as light bulbs for RGB 100R, 100G, and 100B, respectively. In the liquid crystal projector 1100, when the projection light is emitted from a lamp unit 1102 of white light source, like a metal halide lamp, the emitted light is divided into the light components R, G, and B corresponding to three primary colors of RGB by three sheets of mirrors 1106 and two sheets of dichroic mirror 1108, which are guided to light bulbs 100R, 100G, and 100B corresponding to each color, respectively. At this time, especially light B is guided through relay lens system 1121 including an incident lens 1122, a relay lens 1123, and an emit lens 1124 in order to reduce or prevent the light loss due to the long light path. The light components corresponding to the three primary colors modulated by the light bulbs 100R, 100G, and 100B respectively are synthesized again by the dichroic prism 1112 and are then projected as color images to the screen 1120 through the projection lens 1114.

The present invention is not limited to the foregoing exemplary embodiments, and many alternatives, modification, and variations will be allowed within the scope of the claims and the subject matter or idea of the present invention inferable from the whole description. Further, the electro-optical device and the manufacturing method thereof, and the electronic apparatus accompanied with such variations also fall within the technical scope of the present invention. As an electro-optical device, the present invention can be applied to an electrophoresis device or EL (electroluminescent) device:

What is claimed is:

1. A substrate for an electro-optical device having a planarization layer, comprising:
   a substrate;
   a plurality of sub-interlayer-film wiring patterns formed in film formation layers disposed above the substrate;
   interlayer films interlayered amongst the plurality of sub-interlayer-film wiring patterns, at least one of the interlayer films having a planarized surface;
   a plurality of contact holes formed in the planarized interlayer film corresponding to portions of the plurality of sub-interlayer-film wiring patterns; and
   a stacked film formed between the substrate and the plurality of sub-interlayer-film wiring patterns and whose portions corresponding to each region of the plurality of contact holes being equal or nearly equal in thickness.

2. A substrate for an electro-optical device having a planarization layer, comprising:
   a substrate having a plurality of recesses in regions of the substrate surface;
   a plurality of sub-interlayer-film wiring patterns formed in film formation layers disposed in at least one of the regions of the recesses and other regions;
   interlayer films formed on the plurality of sub-interlayer-film wiring patterns, at least one of the interlayer films having a planarized surface;
   a plurality of contact holes formed in the planarized interlayer film corresponding to portions of the plurality of sub-interlayer-film wiring patterns; and
   a stacked film which is formed between the substrate and the plurality of sub-interlayer-film wiring patterns, values obtained by subtracting the sunken distance of the recesses along the normal direction of the substrate surface from the thickness of the stacked film portions corresponding to each region of the plurality of contact holes being equal or nearly equal.

3. A substrate having a planarization layer, comprising:
   a plurality of film formation layers where film formation patterns are formed, respectively;
   interlayer films formed between the plurality of film formation layers, respectively;
   a plurality of sub-interlayer-film wiring patterns formed in the film formation layers beneath a planarized interlayer films of the interlayer films;
   a plurality of contact holes formed in the planarized interlayer films and connecting the plurality of sub-interlayer-film wiring patterns and film formation patterns of layers above the planarized interlayer films; and
   one or more dummy patterns formed in a plurality of positions below the plurality of contact holes, and formed in one or more of the film formation layers under the plurality of sub-interlayer-film wiring patterns, respectively, so as to control positions of the surfaces of the plurality of sub-interlayer-film wiring patterns.

4. The substrate having a planarization layer according to claim 3, the one or more dummy patterns independently controlling the positions of the surfaces of the plurality of sub-interlayer-film wiring patterns so as to extend the plurality of contact holes from the surfaces of the planarized interlayer films to the plurality of sub-interlayer-film wiring patterns by performing an interlayer-film removal step once.

5. The substrate having a planarization layer according to claim 3, the one or more dummy patterns being formed independently of each other under the plurality of sub-interlayer-film wiring patterns so as to equalize the vertical positions of the surfaces of the plurality of sub-interlayer-film wiring patterns.

6. The substrate having a planarization layer according to claim 3, more dummy patterns being formed independently of each other in the same film formation patterns of film formation layers under the plurality of sub-interlayer-film wiring patterns.

7. The substrate having a planarization layer according to claim 3, the dummy patterns being provided to extend from the film formation pattern of film formation layers in other regions of the same layer as the dummy patterns.

8. The substrate having a planarization layer according to claim 3, the one or more dummy patterns being formed so as to equalize the total film thickness of the film formation patterns formed at positions corresponding to each contact hole under the plurality of sub-interlayer-film wiring patterns.

9. The substrate having a planarization layer according to claim 3, the plurality of contact holes being formed by etching the planarized interlayer films, and the one or more dummy patterns controlling, independently of each other, the vertical positions of the surfaces of the plurality of sub-interlayer-film wiring patterns with a permissible margin of only an over-etching portion for any of the plurality of sub-interlayer-film wiring patterns.

10. A method of manufacturing a substrate having a planarization layer, comprising:

forming one or more dummy patterns at one or more positions of one or more film formation layers in the same step as a forming each film formation pattern of a plurality of film formation layers to be stacked, respectively;

forming interlayer films on the film formation layers;

forming a plurality of sub-interlayer-film wiring patterns in wiring layers of the plurality of film formation layers;

planarizing at least one of the interlayer films formed on the wiring layers; and forming a plurality of contact holes to connect the plurality of sub-interlayer-film wiring patterns and a plurality of film formation patterns of layers above the plurality of interlayer films in the planarized interlayer films at a plurality of positions on the dummy patterns, the dummy patterns controlling the vertical positions of the surfaces of the plurality of sub-interlayer-film wiring patterns.

11. A substrate for an electro-optical device, comprising:

a pixel electrode layer where a film formation pattern of pixel electrodes is formed corresponding to each intersection of a plurality of data lines and a plurality of scan lines which are arranged planarly in a matrix;

a first film formation layer where a film formation pattern of the plurality of data lines is formed;

a second film formation layer where a film formation pattern of the plurality of scan lines and a film formation pattern of switching elements for supplying signals to the pixel electrodes are formed;

interlayer films which are formed between the pixel electrode layer, the first film formation layer, and the second film formation layer, respectively;

a plurality of sub-interlayer-film wiring patterns which are formed in film formation layers beneath a planarized interlayer films of the interlayer films, and which are formed in any one of the pixel electrode layer, the first film formation layer, the second film formation layer, and the other film formation layers;

a plurality of contact holes which are formed in the planarized interlayer films in order to connect the plurality of sub-interlayer-film wiring patterns and the film formation patterns of layers above the planarized interlayer films; and one or more dummy patterns which are formed at a plurality of positions under the plurality of contact holes, and which are formed in one or more film formation layers of layers below the plurality of sub-interlayer-film wiring patterns, respectively so as to control the positions of the surfaces of the plurality of sub-interlayer-film wiring patterns.

12. An electro-optical device constructed by using the substrate for an electro-optical device according to claim 11.

13. An electronic apparatus constructed by using the electro-optical device constructed by using the substrate for an electro-optical device according to claim 11.

* * * * *